(12) United States Patent
Kamei et al.

(10) Patent No.: US 8,862,499 B2
(45) Date of Patent: *Oct. 14, 2014

(54) INFORMATION DISTRIBUTION SYSTEM AND METHOD FOR DISTRIBUTING CONTENT INFORMATION

(75) Inventors: Mihoko Kamei, Kanagawa (JP); Kimio Maki, Tokyo (JP); Shiro Miyagi, Tokyo (JP)

(73) Assignee: Sony Corporation, Tokyo (JP)

( * ) Notice: Subject to any disclaimer, the term of this patent is extended or adjusted under 35 U.S.C. 154(b) by 1590 days.

This patent is subject to a terminal disclaimer.

(21) Appl. No.: 11/906,933

(22) Filed: Oct. 4, 2007

(65) Prior Publication Data

US 2008/0077501 A1   Mar. 27, 2008

Related U.S. Application Data

(62) Division of application No. 10/398,695, filed as application No. PCT/JP02/07868 on Aug. 1, 2002.

(30) Foreign Application Priority Data

Aug. 7, 2001 (JP) ............................. P2001-239690

(51) Int. Cl.
| | |
|---|---|
| G06Q 30/00 | (2012.01) |
| H04N 21/4402 | (2011.01) |
| G06Q 30/02 | (2012.01) |
| H04N 1/00 | (2006.01) |
| H04N 7/173 | (2011.01) |
| H04N 21/2343 | (2011.01) |
| H04N 21/258 | (2011.01) |
| H04N 21/2662 | (2011.01) |
| H04N 21/414 | (2011.01) |
| H04N 21/4223 | (2011.01) |
| H04N 21/658 | (2011.01) |
| H04L 29/06 | (2006.01) |
| H04L 29/08 | (2006.01) |
| H04N 1/32 | (2006.01) |

(52) U.S. Cl.
CPC ....... *H04N 21/4402* (2013.01); *G06Q 30/0241* (2013.01); *G06Q 30/0255* (2013.01);
(Continued)

(58) Field of Classification Search
CPC .......... G06Q 30/0241; G06Q 30/0251; G06Q 30/0255; G06Q 30/0257
USPC ........................ 705/14.4, 14.49, 14.53, 14.55
See application file for complete search history.

(56) References Cited

U.S. PATENT DOCUMENTS 6,606,644 B1 * 8/2003 Ford et al. ...................... 709/203
7,545,958 B2 * 6/2009 Ohmura et al. ................ 382/112
(Continued)

FOREIGN PATENT DOCUMENTS

WO    WO 99 17529    4/1999

OTHER PUBLICATIONS

Recommend-it.com, web archives, 1997.*

*Primary Examiner* — Raquel Alvarez
(74) *Attorney, Agent, or Firm* — Frommer Lawrence & Haug LLP; William S. Frommer; Ellen Marcie Emas

(57) ABSTRACT

This invention provides an information distribution system comprising an image data processing device (11), a server (12), and a portable telephone unit (15 having image data acquisition means for acquiring image data with a destination address attached thereto and display means for displaying the image data, wherein the image data is distributed from the image data processing device (11) to the portable telephone unit (15), and advertisement information based on user information is extracted from an advertisement information storage unit (29) and appended to image/text data by an advertisement information appending unit (30) provided in the server 12.

46 Claims, 33 Drawing Sheets

(52) U.S. Cl.
CPC ........... *G06Q 30/0257* (2013.01); *G06Q 30/02* (2013.01); *G06Q 30/0207* (2013.01); *G06Q 30/0251* (2013.01); *G06Q 30/0267* (2013.01); *H04N 1/00209* (2013.01); *H04N 1/00244* (2013.01); *H04N 1/00307* (2013.01); *H04N 1/0035* (2013.01); *H04N 1/32128* (2013.01); *H04N 7/17318* (2013.01); *H04N 21/234363* (2013.01); *H04N 21/25825* (2013.01); *H04N 21/25875* (2013.01); *H04N 21/2662* (2013.01); *H04N 21/41407* (2013.01); *H04N 21/4223* (2013.01); *H04N 21/6582* (2013.01); *H04N 2201/0065* (2013.01); *H04N 2201/3245* (2013.01); *H04N 2201/3249* (2013.01); *H04N 2201/3273* (2013.01); *H04N 2201/3278* (2013.01); *H04L 65/605* (2013.01); *H04L 65/1073* (2013.01); *H04L 65/4084* (2013.01); *H04L 65/607* (2013.01); *H04L 65/80* (2013.01); *H04L 67/306* (2013.01)
USPC ................. 705/14.55; 705/14.4; 705/14.49; 705/14.53

(56) References Cited

U.S. PATENT DOCUMENTS

2001/0034225 A1* 10/2001 Gupte et al. ................. 455/412
2002/0091569 A1* 7/2002 Kitaura et al. ................. 705/14

* cited by examiner

YOUR PORTABLE TELEPHONE IS NOT AN SSL-CONFORMABLE PORTABLE TELEPHONE UNIT. WE ARE SORRY, BUT YOU CANNOT USE THIS FUNCTION.

\* IN ORDER TO USE THIS FUNCTION, YOU NEED TO INPUT THE CUSTOMER ID AND PASSWORD. TO PROTECT YOUR PERSONAL DATA, WE ALLOW ONLY SSL-CONFORMABLE TELEPHONE UNITS.

■ BACK

FIG.20

HAVE YOU FINISHED REGISTRATION TO THE INFORMATION DISTRIBUTION SERVICE FUNCTION? IN ORDER TO USE THIS FUNCTION, REGISTRATION IS NECESSARY. FOLLOW THE REGISTRATION PROCEDURE.

BACK

CONFIRMATION OF
TRANSMISSION
DESTINATIONS

09012345678@○○○.ne.jp
09098765432@○○○.ne.jp
09012121212@○○○.ne.jp
09023232323@○○○.ne.jp
09034343434@○○○.ne.jp
09045454545@○○○.ne.jp

■ <u>BACK</u>

FIG.26

INFORMATION DISTRIBUTION SYSTEM AND METHOD FOR DISTRIBUTING CONTENT INFORMATION

This is a division of application Ser. No. 10/398,695, filed Apr. 4, 2003 pursuant to 35 USC 371 and based on International Application PCT/JP02/07868 filed on Aug. 1, 2002, which is entitled to the priority filing date of Japanese application 2001-239690, filed in Japan on Aug. 7, 2001, the entirety of which is incorporated herein by reference.

TECHNICAL FIELD

This invention relates to an information distribution system and an information distribution method interlocked with an image data communication system, and also relates to an information providing device and an information providing method. Particularly, this invention relates to an information distribution system and an information distribution method which enable distribution of optimum content information to users on the basis of registration contents for the use of an image data communication system, and also relates to an information providing device and method used in this information distribution system.

BACKGROUND ART

Recently, distribution of content information such as images including motion images and still images, music and the like through a communication network has been popularly used. For example, in an image distribution system for distributing image data as content information, an image processing server is prepared on a network and it provides a service of once uploading an image to this image processing server, then automatically converting the uploaded image to the data quantity and the number of colors that can be processed at a portable information processing terminal, and downloading the converted image to the portable information processing terminal so that the converted image can be used at the portable information processing terminal.

Interlocked with such a service, there exists an advertisement information distribution service for distributing advertisement information together with a content to be sent to a portable information processing terminal.

In the conventional advertisement information distribution service, advertisement information of the same content is distributed to all the users. The conventional advertisement information distribution service has a problem that useful information for each user cannot be distributed. Moreover, since the advertisement information of the same content is distributed to all the users, users who receive unwanted advertisement information might take the distribution of this advertisement information as a nuisance and complain to the service provider.

Furthermore, in the conventional advertisement information service, the service provider distributes advertisement information one-sidedly and therefore the information is not shared by users.

DISCLOSURE OF THE INVENTION

In view of the foregoing status of the art, it is an object of the present invention to provide an information distribution system and an information distribution method which enable distribution of useful information for each user and sharing of specific information by users, and an information providing device and an information providing method used in these information distribution system and information distribution method.

In order to achieve the foregoing object, an information distribution system according to the present invention comprises: an image data processing terminal having display means for displaying image data, and image data transmission means for transmitting the image data to outside; an information providing device having image data saving means for saving the image data, and address information appending means for appending to the image data, a destination address for referring to the image data from outside; and a portable radio communication terminal having image data acquisition means for acquiring the image data with the destination address appended thereto, and display means for displaying the image data; the information distribution system having an image data distribution function for distributing the image data from the image data processing terminal to the portable communication terminal; wherein connection from the image data processing terminal is identified using identification information issued at the time of registration, and optimum content information is extracted from content information storage means on the basis of user information stored in storage means for storing the identification information and user information corresponding to the identification information and is attached to the image data, which is then transmitted.

An information distribution system according to the present invention comprises: a first information processing terminal having data transmission/reception means for transmitting and receiving data; an information providing device having data saving means for saving the data, and address information appending means for appending to the data a destination address for referring to the data from outside; and a second information processing terminal having data acquisition means for acquiring the data with the destination address appended thereto, and display means for displaying the data; the information distribution system having an image data distribution function for distributing the data from the first information processing terminal to the second information processing terminal; wherein optimum content information is extracted from content information storage means on the basis of the content of information transmitted and received between individual users and is attached to the image data, which is then transmitted.

An information distribution method according to the present invention comprises: a display step of displaying image data at an image data processing terminal; an image data transmission step of transmitting the image data to outside; an information providing step including an image data saving step of saving the image data, and an address information appending step of appending to the image data a destination address for referring to the image data from outside; an image data acquisition step of acquiring the image data with the destination address appended thereto at a portable radio communication terminal; and a display step of displaying the image data; the information distribution method having an image data distribution function for distributing the image data from the image data processing terminal to the portable communication terminal; wherein connection from the image data processing terminal is identified using identification information issued at the time of registration, and at a content information providing step, optimum content information is extracted on the basis of user information stored in storage means for storing the identification information and user information corresponding to the identification information and is attached to the image data, which is then transmitted.

An information distribution method according to the present invention comprises: a data transmission/reception step of transmitting data at a first information processing terminal; an information providing step including a data saving step of saving the data, and an address information appending step of appending to the data a destination address for referring to the data from outside; and a data acquisition step of acquiring the data with the destination address appended thereto at a second information processing terminal and a display step of displaying the data; the information distribution method utilizing an image data distribution method for distributing the data from the first information processing terminal to the second information processing terminal; wherein optimum content information is extracted from content information storage means on the basis of the content of information transmitted and received between individual users and is attached to the image data, which is then transmitted.

An information providing device according to the present invention comprises: image data transmission/reception means for transmitting and receiving image data from an image data processing terminal through a network; image data saving means for saving the received image data; address information appending means for appending to the image data a destination address for referring to the image data from outside; storage means for storing user information; content information storing means for storing content information; and content information attaching means for attaching the content information to the image data on the basis of the user information; wherein content information selected on the basis of user information identifying the user is transmitted to the user.

In the information providing device according to the present invention, connection from the image data processing terminal is identified using identification information issued at the time of registration, and optimum content information is extracted on the basis of the user information stored in the storage means for storing the identification information and the user information corresponding to the identification information and is attached to the image data, which is then transmitted.

An information providing method according to the present invention comprises: an image data transmission/reception step of transmitting and receiving image data from an image data processing terminal through a network; an image data saving step of saving the received image data; an address information appending step of appending to the image data a destination address for referring to the image data from outside; a storage step of storing user information; and a content information attaching step of attaching content information to the image data on the basis of the user information; wherein content information selected on the basis of user information identifying the user is transmitted to the user.

In the information providing method, connection from the image data processing terminal is identified using identification information issued at the time of registration, and optimum content information is extracted on the basis of the user information stored in storage means for storing the identification information and the user information corresponding to the identification information and is attached to the image data, which is then transmitted.

The other objects of the present invention and specific advantages provided by the present invention will be further clarified by the following description of embodiments with reference to the drawings.

BRIEF DESCRIPTION OF THE DRAWINGS

FIG. 20 is a view showing an exemplary error message screen structure that is transmitted to a user's portable radio communication terminal in the information distribution system according to the present invention.

FIG. 26 is a view showing an exemplary transmission destination display screen that is transmitted to a user's portable radio communication terminal in still another exemplary information distribution system to which the present invention is applied.

BEST MODE FOR CARRYING OUT THE INVENTION

An information distribution system according to the present invention is a system which enables distribution of image data to a distribution recipient desired by a registered user by using an image data distribution function that is made available by making registration for use in advance. In the information distribution system to which the present invention is applied, data to be distributed is temporarily saved as data of a standard format, and when a transmission request is sent from a communication terminal at a distribution destination, the data can be converted to an optimum image data format in accordance with the communication terminal and then transmitted. Moreover, in this information distribution system, optimum content information can be distributed to a user and an information distribution recipient desired by the user, by using user registration information acquired when the user made registration in advance.

Hereinafter, an embodiment of the present invention will be described with reference to the drawings.

Figure 1:
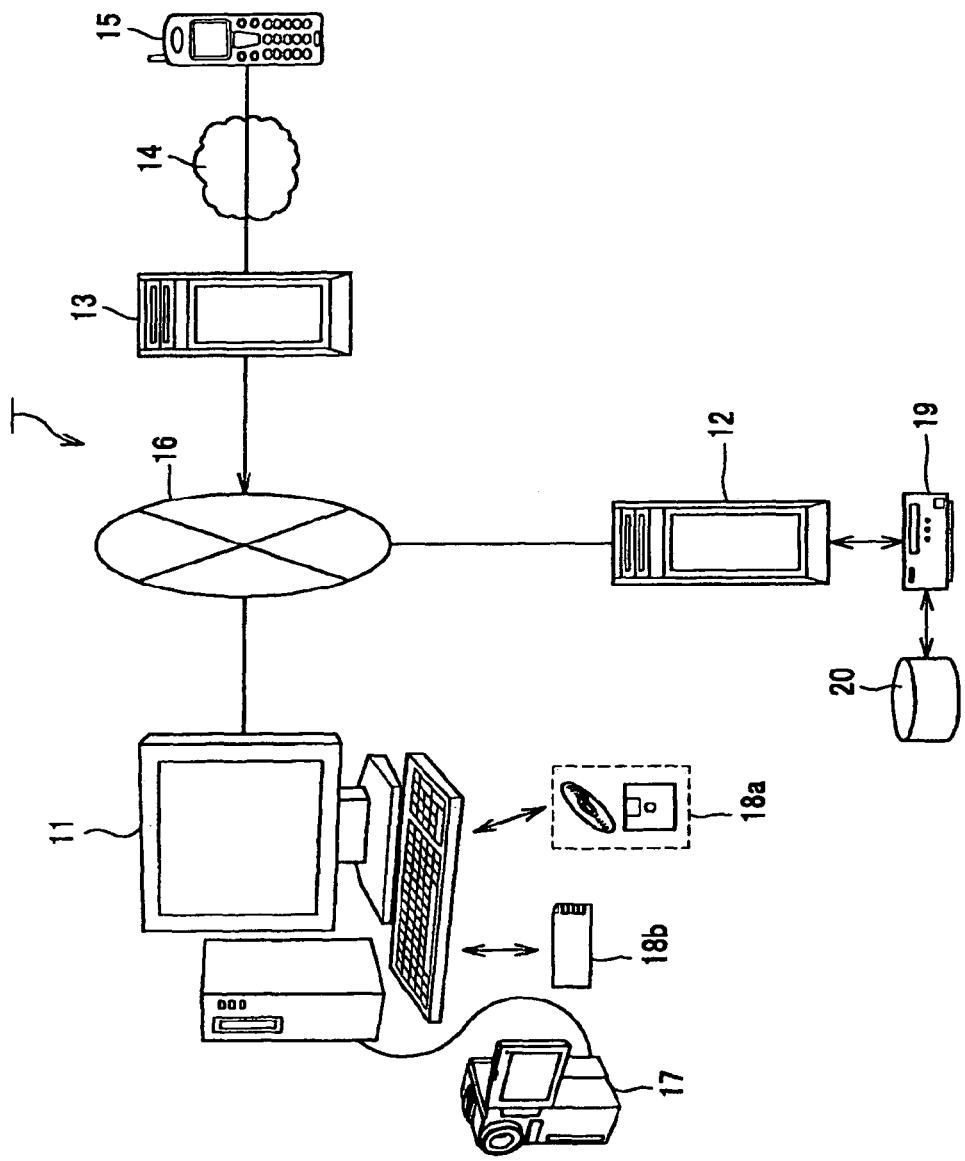
FIG. 1 is a structural view showing the schematic structure of an information distribution system to which the present invention is applied.

An information distribution system 1 to which the present invention is applied has an image data processing device 11 having an image data processing function and a communication function, a server 12 for storing image data transmitted from the image data processing device 11, and a portable telephone base station 13 connected with a portable telephone unit 15 through a portable telephone communication network 14, as shown in FIG. 1.

This is a system for distributing advertisement information using an image data distribution system in which the image data processing device 11, the server 12 and the portable telephone base station 13 constituting the information distribution system 1 according to the present invention are connected with each other through a wire network 16.

The wire network 16 is the so-called Internet. The portable telephone unit 15 is a portable telephone unit that can be connected to the wire network 16 via the portable telephone base station 13.

The image data processing device 11 is, for example, a personal computer capable of performing various image processing on image data by using software-based processing or a hardware structure. The image data processing device 11 can be connected with a digital image pickup device 17 such as a digital video camera or a digital still camera by using a general-purpose interface and can receive image data captured by the digital image pickup device 17. The image data processing device 11 also has driver units supporting a recording medium 18a such as an optical disc-like recording medium, typically, a CD (compact disc) or a DVD (digital versatile disc), or a magnetic recording medium, typically, an FD (flexible disk), and a semiconductor storage device 18b such as a flash memory (trademark registered) or a memory stick (trademark registered). The image data processing device 11 can read image data also from the recording medium 18a or the semiconductor storage device 18b.

In the above-described example, image data is temporarily read into the image data processing device 11. However, a system structure which does not include the image data processing device 11 is also possible. In this case, for example, a portable telephone unit is connected to the digital image pickup device 17 and image data is directly transferred to the portable telephone unit 15 at the distribution destination. Connecting the digital image pickup device 17 with the portable telephone unit is an example of measures for connecting the digital image pickup device 17 to the wire network 16, and a fixed telephone or the like may be used instead of the portable telephone unit. Alternatively, connection means to the wire network 16 may be provided in the digital image pickup device 17 itself. Moreover, the digital image pickup device 17 is not limited to a camera or a scanner and may be a PDA (personal digital assistant) with a built-in CCD (charge-coupled device) camera, or a portable telephone unit with a built-in CCD camera.

The image data processing device 11 reads image data from the digital image pickup device 17, the recording medium 18a or the semiconductor storage device 18b, and converts the image data to image data of a standard format. Conversion to image data of a standard format can be carried out using dedicated conversion software that is distributed by a provider providing this information distribution system. Image data of a standard format is image data having a data quantity, an image data file format and the like that can be processed at the portable telephone unit 15. The "standard format" in this case means "standard" in an image data distribution system as a basis of the information distribution system of this specific example. In this specific example, in order to minimize deterioration of image data and data loss, image data using a GIF (Graphics Interchange Format) file format of reversible compression and having a data quantity of 10 kilobytes or less is used.

In the information distribution system 1, since image data is converted to a predetermined format in advance to limit the data quantity and then transmitted to the server 12, the connection time is reduced when transmitting the image to the server. Moreover, the capacity of the server 12 can be saved.

However, with respect to the image data file format, the image size and the data quantity to be employed for standard image data, various options are possible, for example, conforming to the standard defined by the majority of telephone companies, of plural telephone companies providing potable telephone services.

Using the image data processing device 11, a user converts desired image data to image data of the above-described standard format and prepares text data which the user wants to attach to the image data. The image data processing device 11 prepares image/text data including the image data and the text data, using the conversion software. The image/text data is described, for example, as Web page data of the part/form-data format. This image/text data is transmitted to the server 12.

The server 12 is connected with an authentication server 19 for saving authentication ID and password for authenticating whether or not a person accessing the server 12 via the wire network 16 is a user who has registered for using the image data distribution system, and a user information database 20 in which user information of registered users is stored.

As a method for authenticating a user, for example, authentication ID and password, issued in advance at the time of registration by the service provider of the image data distribution system to a user who registered for service use, may be authenticated at the time of access.

As a method for user registration, for example, necessary items may be entered on a Web page sent from the server to a personal computer or the like via the wire network 16, or the digital image pickup device 17 to which an application form for user registration is attached may be sold. Alternatively, a user may apply for user registration by telephone or mailing an application postcard. When a user registers, user information of the user who wants to be registered is acquired. As registration for use is completed, authentication ID and password are sent to the user from the service provider, for example, by mail or facsimile.

Figure 2:
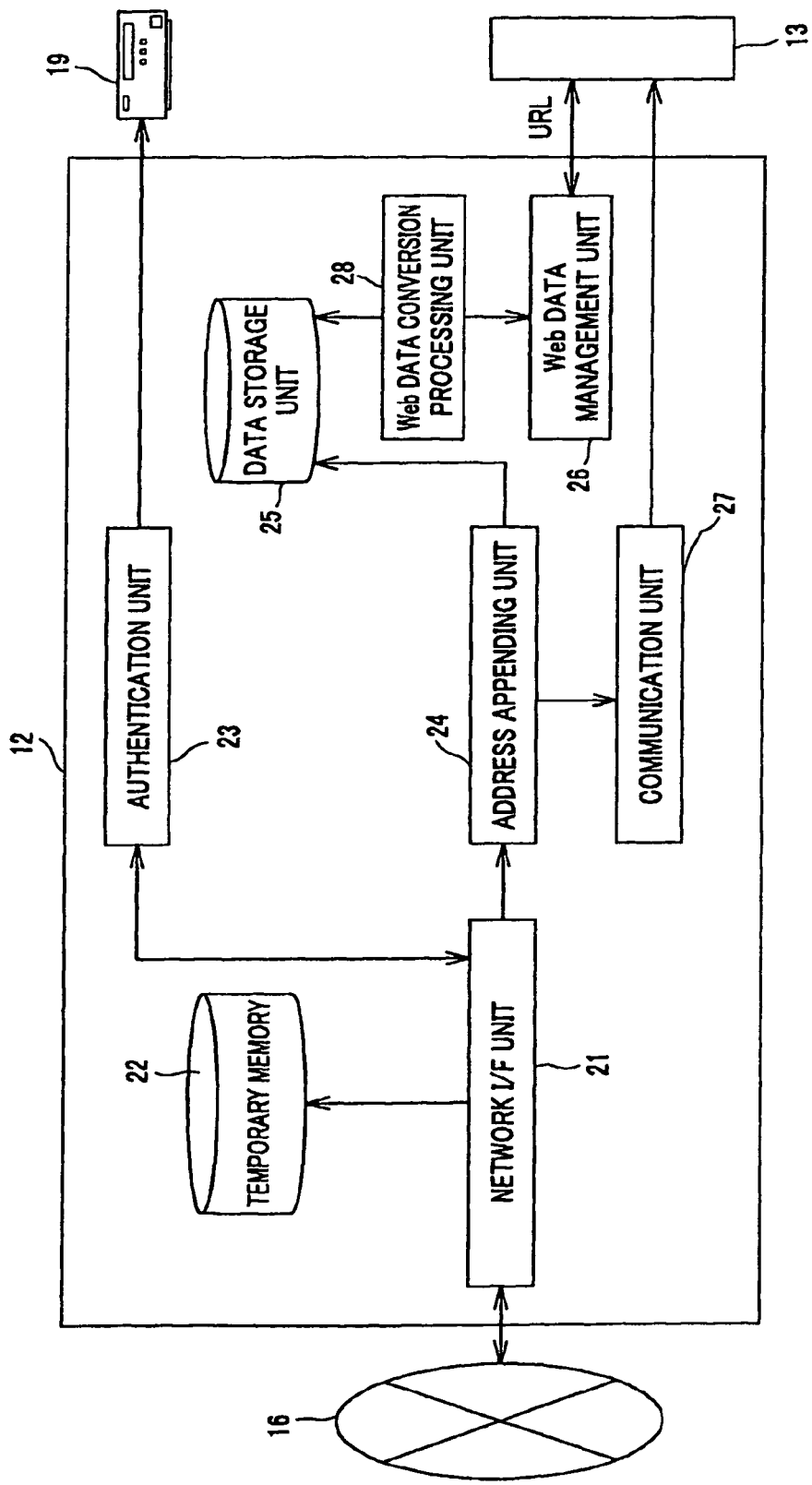
FIG. 2 is a structural view for explaining the structure of a server in the information distribution system according to the present invention.

The server 12 has the following units as shown in FIG. 2: a network interface unit (hereinafter referred to as network I/F unit) 21 for receiving image data, authentication ID and password transmitted thereto via the wire network 16; a temporary memory 22 for temporarily saving the received data; an authentication unit 23 for checking the received authentication ID and password with authentication data saved in the authentication server 19; an address appending unit 24 for appending, to image/text data sent from a user, a URL (uniform resource locator) as a destination address indicating the storage position in a data storage unit 25; the data storage unit 25 for storing the image/text data; a Web data management unit 26 for managing communication with the portable telephone unit 15; a communication unit 27 for transmitting the URL indicating the saving location where the image data is stored, to a distribution destination designated by the user for distribution of the image data; and a Web data conversion processing unit 28 for converting Web data to be transmitted, in accordance with the terminal at the distribution destination. These units are integrally controlled by a control unit, not shown.

In this specific example, image/text data is converted to Web page data of the multipart/form-data format by the image data processing device 11 and then transmitted to and received by the server 12. Then, the Web page data is converted to data of the HTML (Hypertext Markup Language) format or the like.

However, the data format when data is stored in the data storage unit 25 of the server 12 is not particularly limited. For example, data of the multipart/form-data format may be stored. Alternatively, image data and text data of image/text data may be separated, and for the text data, for example, title data, text content data and the like can be separately stored. In the case of separately storing data, when sending the data to the portable telephone unit 15 at the distribution destination, the separate data are reassembled and then transmitted on the basis of the data format such as the HTML format. Separately storing respective data of image/text data is advantageous in that the efficiency of conversion processing in the case of conversion to an optimum data format for the portable telephone unit of the distribution destination is improved.

Figure 3:
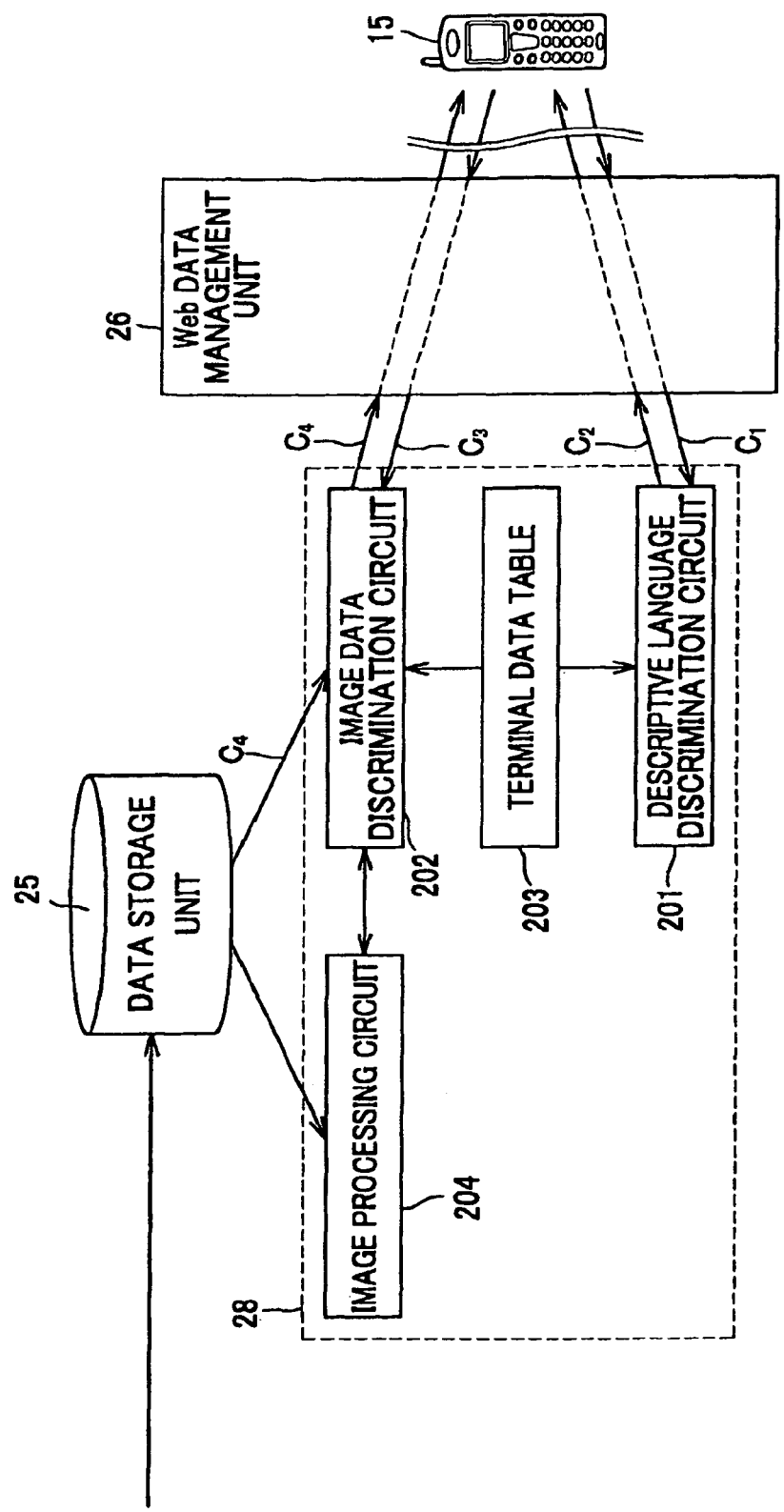
FIG. 3 is a structural view for explaining the structure of a Web data conversion processing unit in the information distribution system according to the present invention.

The Web data conversion processing unit 28 is specifically a CGI (common gateway interface) for using an external program in the server 12. As shown in FIG. 3, the Web data conversion processing unit 28 has a descriptive language discrimination circuit 201 for discriminating the descriptive language of Web data used by the portable telephone unit 15 at the distribution destination, an image data discrimination circuit 202 for discriminating the image data format of the portable telephone unit 15 at the distribution destination, a terminal data table 203 in which the machine type of the terminal and the standard of image data are stored as a table, and an image processing circuit 204 for performing image processing corresponding to the results of the discriminations by the descriptive language discrimination circuit 201 and the image data discrimination circuit 202.

On receiving a text data request signal C1 from the portable telephone unit 15, the descriptive language discrimination circuit 201 determines the communication service provider and the machine type of the terminal from this signal, then extracts a descriptive language corresponding to the result of the discrimination from the terminal data table 203, converts text data to this format, and transmits a test data response signal C2. The descriptive language may be, for example, the HTML (Hypertext Markup Language) format or HDML (handheld Device Markup Language) format or the like.

On receiving an image data request signal C3 from the portable telephone unit 15, the image data discrimination circuit 202 determines the communication service provider and the machine type of the terminal from this signal, then extracts an image data format corresponding to the result of the discrimination from the terminal data table 203, converts image data to this image data format, and transmits an image data response signal C4. Here, the image data file format such as GIF format or PNG format, the designated pixel size and the like are collectively referred to as image data format.

In this specific example, image data from a user, which has already been converted to the standard of a predetermined communication service provider A, that is, GIF format, with a data quantity of 10 kilobytes or less in the image data processing device 11 as described above, is transmitted and saved in the data storage unit 25.

Figure 4:
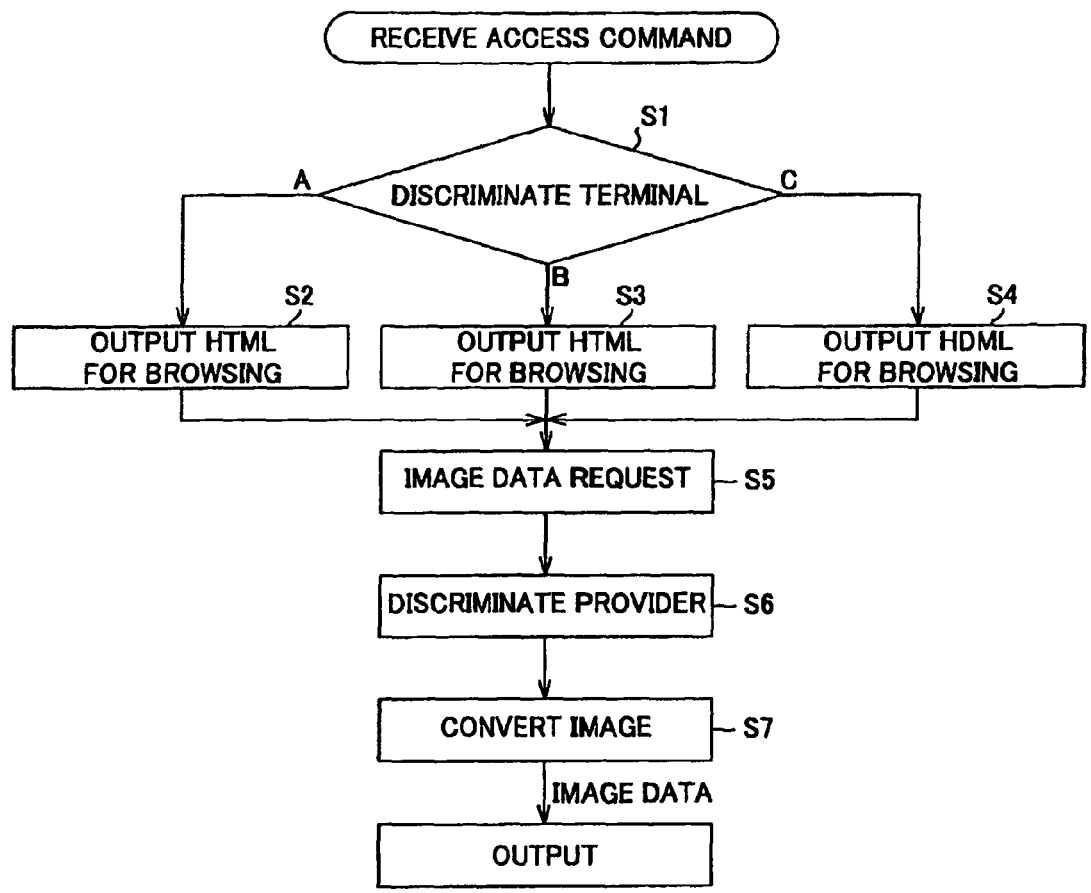
FIG. 4 is a flowchart for explaining the processing to convert image data and a descriptive language contained in Web data in the information distribution system to which the present invention is applied.
Figure 5:
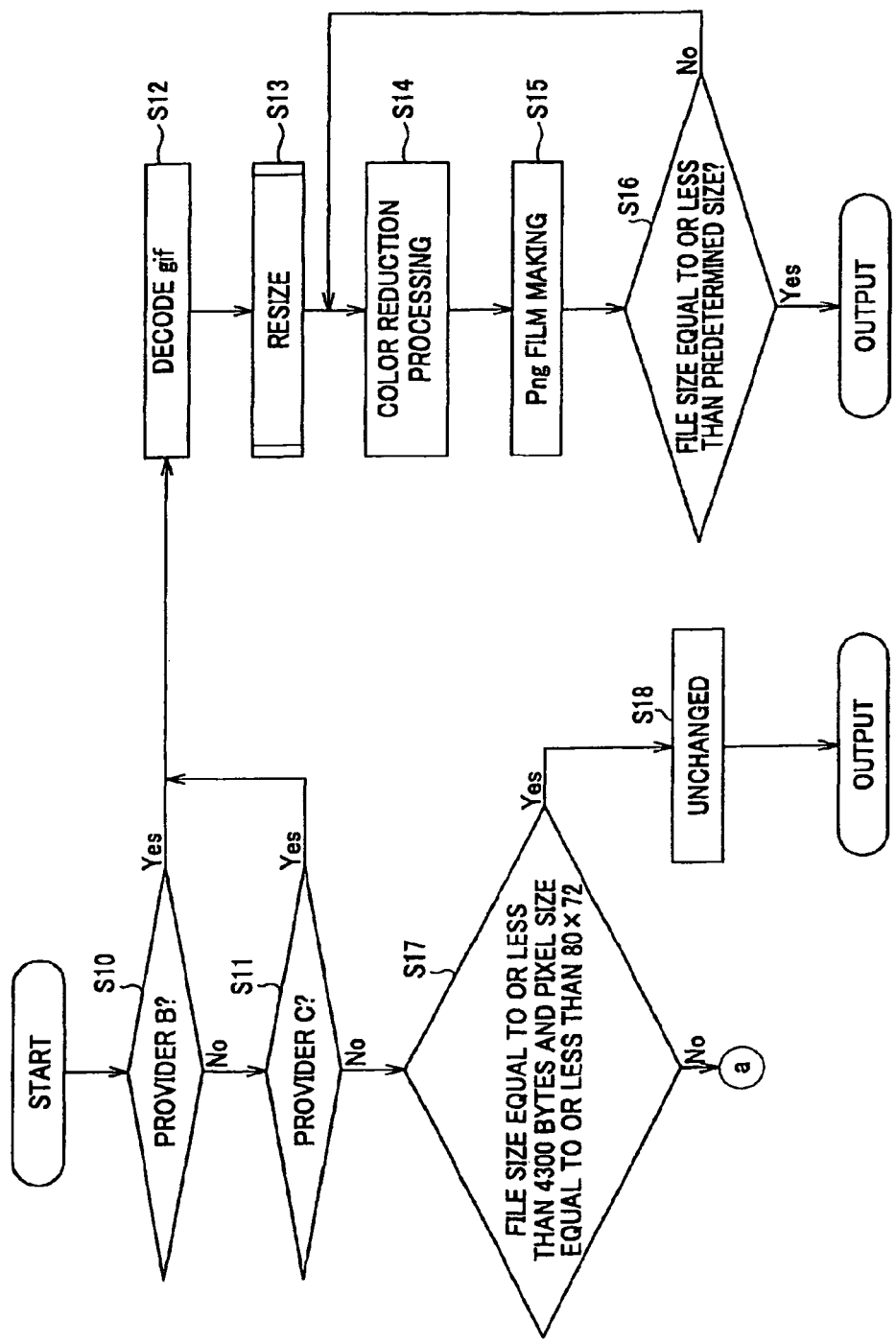
FIG. 5 is a flowchart for explaining image data discrimination processing in the information distribution system according to the present invention.

The processing to convert the image data and the descriptive language contained in the Web data of the Web data conversion processing unit 28 will now be described with reference to FIG. 4. In this specific example, it is assumed that there are three communication service providers A, B and C. The information distribution system 1 discriminates the difference in standard between these three communication service providers, then converts image/text data to optimum image/text data for each portable telephone unit, and transmits the optimum image/text data.

As the server 12 receives an access command (text data request signal) from a certain portable telephone unit, the Web data conversion processing unit 28 at step S1 discriminates the communication service provider, as the processing within the server 12.

If the service provider is the provider A, the descriptive language discrimination circuit 201 at step S2 transmits Web data as data of the HTML format. If the service provider is the provider B, the descriptive language discrimination circuit 201 at step S3 transmits Web data as data of the HTML format. If the service provider is the provider C, the descriptive language discrimination circuit 201 at step S4 transmits Web data as data of the HDML format.

As the text data of the HTML or HDML format is transmitted to the potable telephone unit, the portable telephone unit at step S5 sends an image data request signal.

The image data discrimination circuit 202 of the Web data conversion processing unit 28 discriminates the communication service provider and the machine type of the terminal (step S6). The image data is converted to an image data format extracted from the supporting table stored in the terminal data table 203 (step S7) and the converted image data is outputted.

The above-described series of processing in the Web data conversion processing unit 28 may be executed using software. Alternatively, it can be executed by the control unit of the server 12.

The discrimination of image data will be described further in detail with reference to FIGS. 5 to 8. In the discrimination of the terminal at step S1 of FIG. 4, if the portable telephone unit which transmitted an access command to the server 12 is of the provider B or the provider C, whether it is the provider B is discriminated at step S10 and whether it is the provider C is discriminated at step S11. If it is the provider B or the provider C, the processing goes to step S12 and the image data of the GIF format, of the image/text data, is decoded. At step S13, resizing processing is carried out. The resizing processing will be later described in detail.

Next, in order to make the file size equal to or less than a predetermined file size, color reduction processing and PNG file processing are carried out at steps S14 and S15. At step S16, whether the file size is not larger than the predetermined file size is discriminated. If the file size is not within the predetermined range, the steps S14 and S15 are repeated. If the file size of the image/text data is within the predetermined range, the data is outputted to the portable telephone unit.

On the other hand, if it is determined at step S11 that the portable telephone unit is conformable to none of the standards of the providers A, B and C, whether the standard of image data of this portable telephone unit prescribes, for example, a file size of 4.3 kilobytes or less and a pixel size of 80×72 or less is discriminated at step S17. If it is conformable to these sizes, the image data format of the image data saved in the data storage unit 25 is left unmodified and the image data is outputted as it is at step S18. The standard of image data prescribing a file size of 4.3 kilobytes or less and a pixel size of 80×72 or less enables the image data to be displayed on any portable telephone unit conformable to the standard of the provider A.

Figure 6:
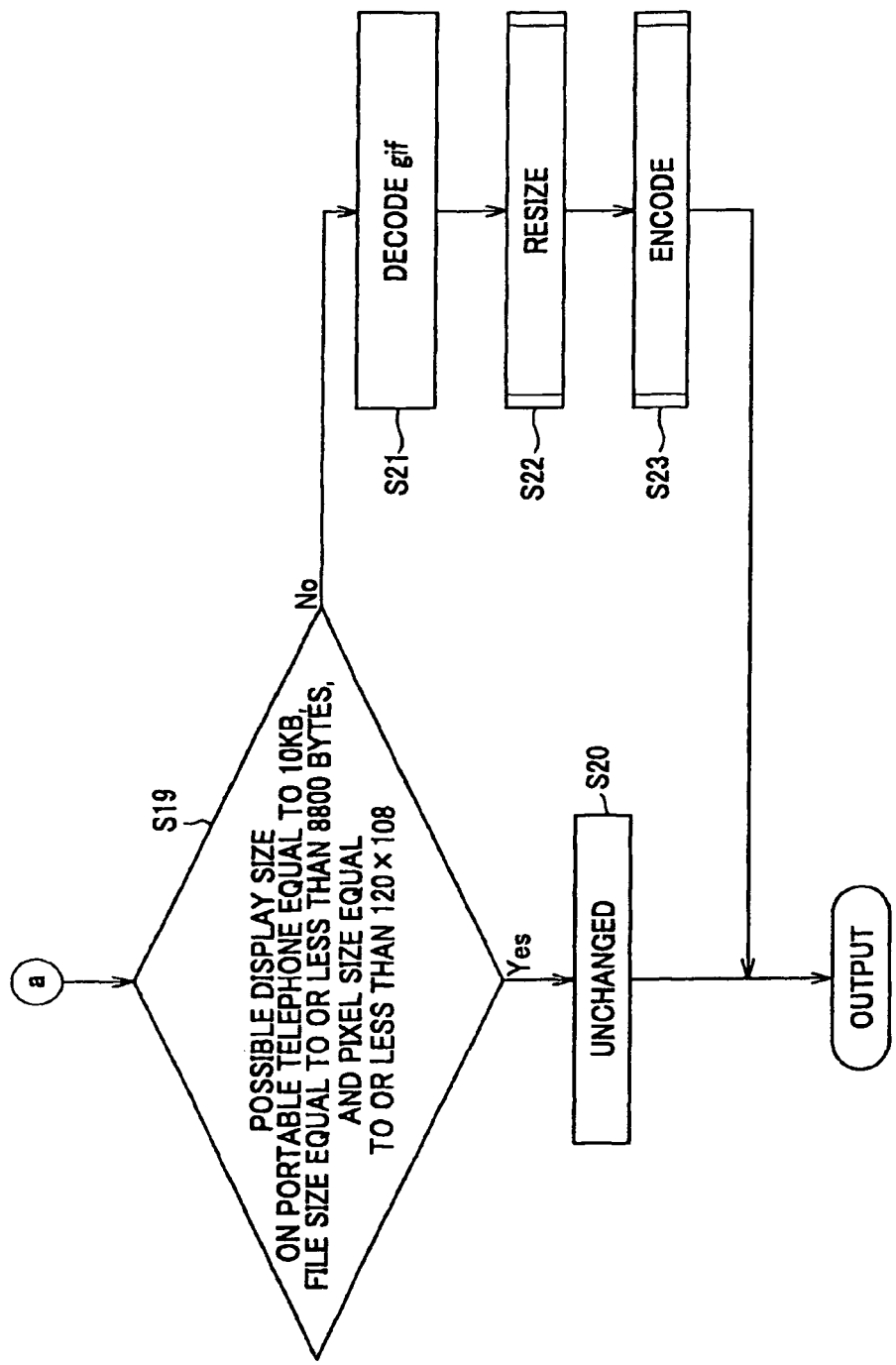
FIG. 6 is a flowchart for explaining image data discrimination processing in the information distribution system according to the present invention.

If it is determined at step S17 that the standard does not prescribe a file size of 4.3 kilobytes or less and a pixel size of 80×72 or less, it is discriminated at step S19 of FIG. 6 whether a possible display size on the portable telephone unit is 10 kilobytes and the file size of the image data is 8.8 kilobytes or less and the pixel size is 120×108 or less. If these conditions are met, the image data format of the image data stored in the data storage unit 25 is left unmodified and the image data is outputted as it is at step S20.

If the conditions of the possible display size on the portable telephone unit of 10 kilobytes, the file size of the image data of 8.8 kilobytes or less and the pixel size of 120×108 or less are not met, decoding from the GIF format is carried out at step S21, and resizing processing to support this image data is carried out at step S22. At step S23, the resized image data is encoded to the GIF format and then outputted.

Figure 7:
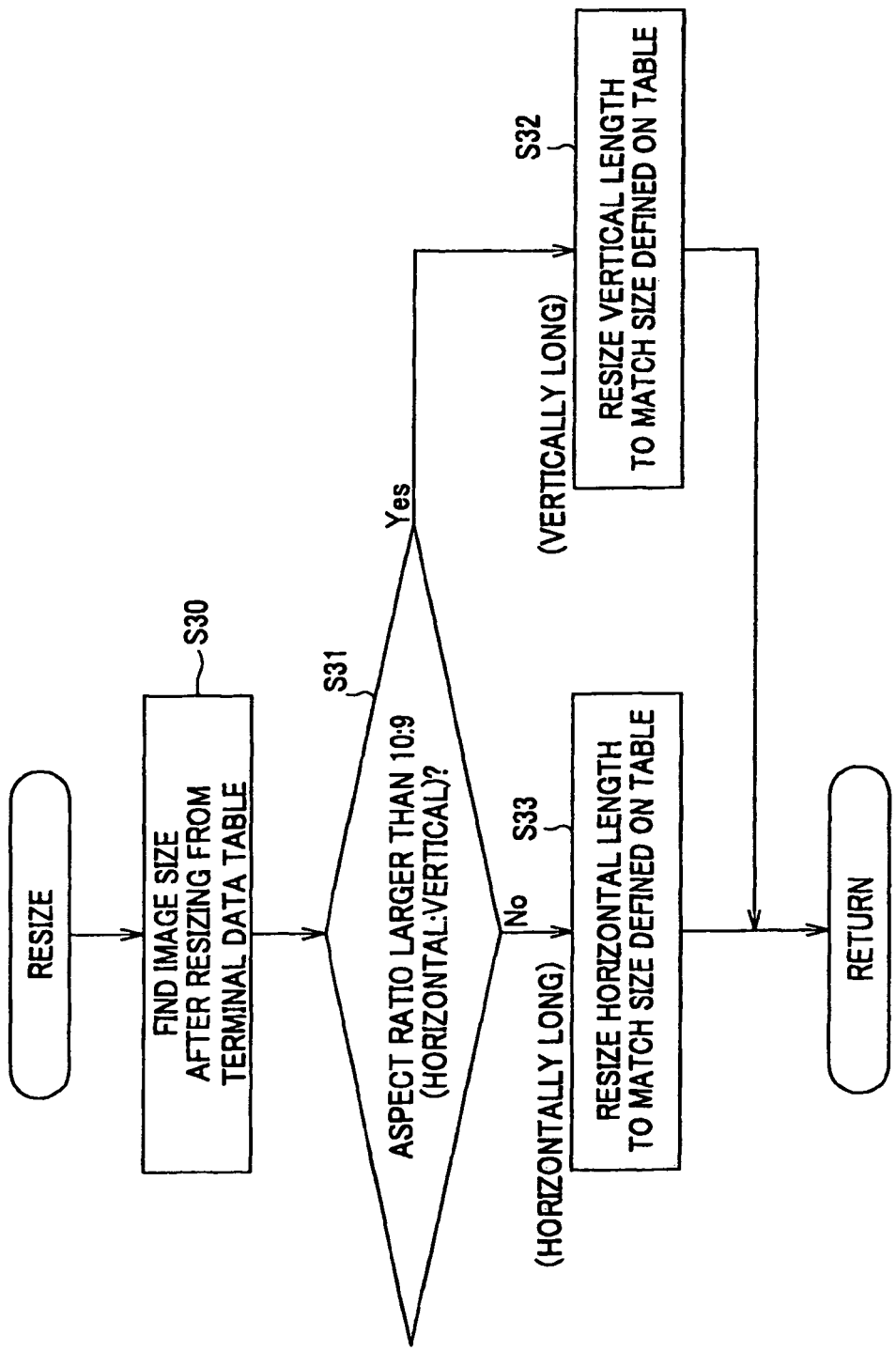
FIG. 7 is a flowchart for explaining resizing processing in the image data discrimination processing of the information distribution system according to the present invention.

FIG. 7 shows the above-described resizing processing. At step S30, the image data discrimination circuit 202 extracts the image frame size of image data after resizing, from the terminal data table 203.

Next, at step S31, the aspect ratio of the image data is discriminated. If the aspect ratio is larger than 10:9 (horizontal:vertical), at step S32, the vertical length of the image data is resized to the data size defined on the terminal data table 203. If the aspect ratio is smaller than 10:9 (horizontal:vertical), the horizontal length of the image data is resized to the data size defined on the terminal data table 203. The aspect ratio 10:9 (horizontal:vertical) of the image data in this case is the aspect ratio of image data saved in the data storage unit 25.

Figure 8:
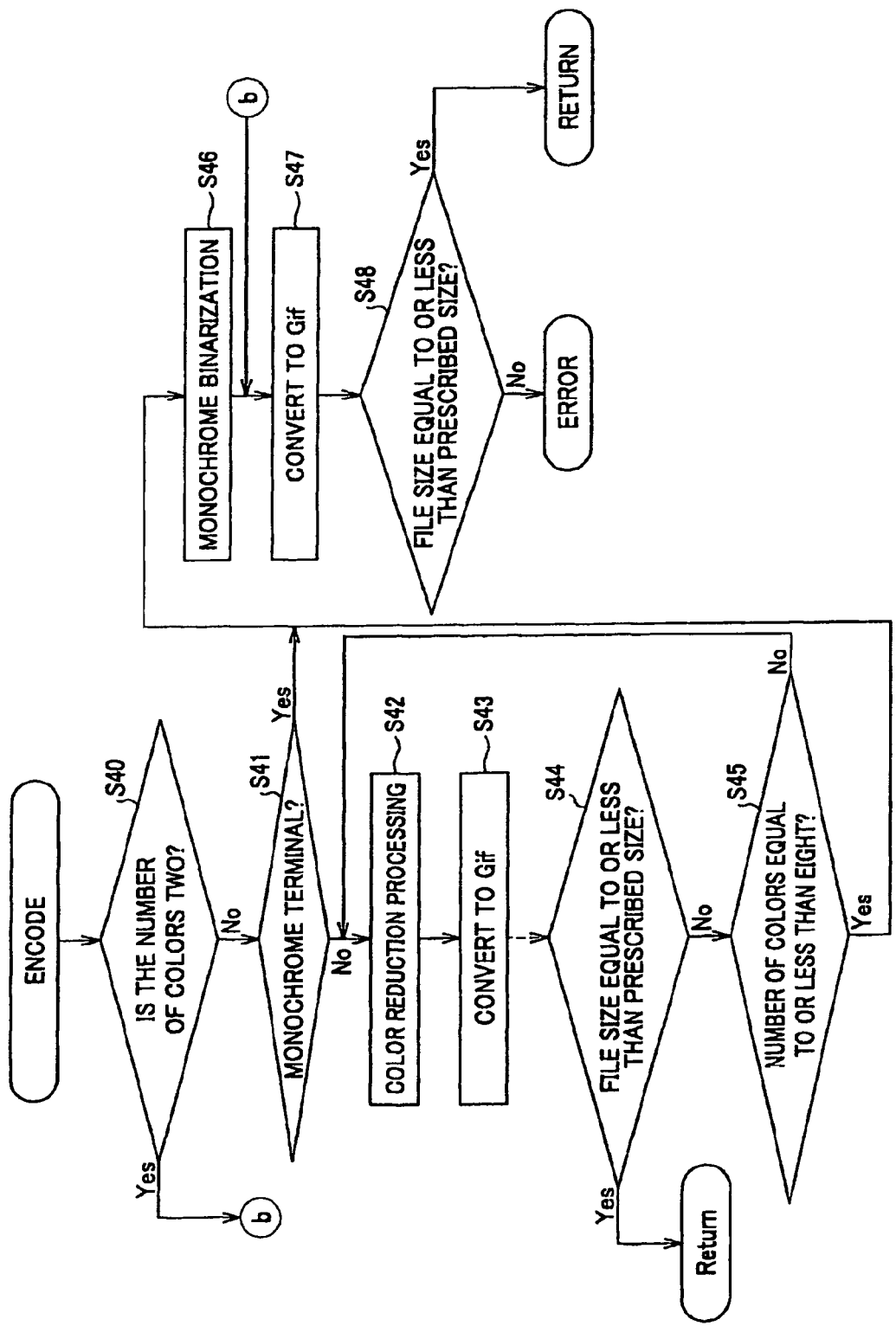
FIG. 8 is a flowchart for explaining encoding processing in the image data discrimination processing of the information distribution system according to the present invention.

FIG. 8 shows the encoding processing. In the encoding processing, first, the number of colors is discriminated at step S40. If the number of colors is two, the processing goes to step S47 subsequent to "b". If the number of colors is not two, whether or not the portable telephone unit is of a monochrome display type is discriminated at step S41. If the portable telephone unit is of a monochrome display type, the processing goes to step S46, which will be described later.

If the portable telephone unit is not a monochrome display-type terminal, color reduction processing of the image data is carried out at step S42 and the image data is converted to the GIF format at step S43.

At step S44, whether or not the file size is equal to or less than a prescribed size is discriminated. If the file size is equal to or less than the prescribed size, the processing returns to FIG. 6. If the file size is larger than the prescribed size, whether or not the number of colors is equal to or less than eight is discriminated at step S45. If the number of colors is not equal to or less than eight, the processing returns to step S42 and the color reduction processing is carried out. If the number of colors is equal to or less than eight, the processing goes to step S46 and monochrome binarization is carried out. Next, the image data is converted to the GIF format at step S47 and the file size is confirmed at step S48. If the file size is equal to or less than a prescribed value, the processing returns to FIG. 6. If a file size equal to or less than the prescribed value cannot be obtained even after executing the series of processing, error processing starts.

In the above-described information distribution system, image data is automatically converted to an image data file format supporting the image display standard of a portable telephone unit at a distribution destination of the image data and then outputted thereto. Because the standard of the image data format of the communication service provider A is adopted in this specification, as a standard image data format saved in the data storage unit 25, it may not be necessary to carry out image data conversion processing with respect to portable telephone units which receive communication services from the provider A. Therefore, there is an advantage that the processing is simplified.

Conventionally, each communication service provider has poor data compatibility and therefore sources must be provided for respective communication service providers in accordance with data to be distributed to a portable telephone unit. However, in the information distribution system 1, which has embodied the present invention, data can be automatically converted to a data file format supporting the image display standard of a portable telephone unit at a distribution destination of the data and then outputted. Therefore, it suffices to provide one source and the system is simplified, improving the advantage in cost of system design and system construction.

The information distribution system according to the present invention can provide common content information distribution services to portable telephone units of different communication service providers, by employing the terminal discrimination as described above.

Now, distribution of optimum content information to a registered user and a recipient desired by the user, using an information distribution system 2 as another specific example of the present invention, will be described. In this specific example, content information is particularly advertisement information. In this case, advertisement information as content information includes image information including dynamic images and still images, audio information, character information and the like. That is, the following specific example is an advertisement information distribution system utilizing the information distribution system 1.

The information distribution system 2 in this example has a similar structure to that of the information distribution system 1 shown in FIG. 1. Therefore, constituent elements having the same functions and effects are denoted by the same numerals and will not be described further in detail.

The information distribution system 2 is characterized in that an advertisement information storage unit 29 for storing advertisement information and an advertisement information appending unit 30 for selecting and attaching advertisement information to image/text data are provided in a server 12. However, in the structure of the server 12, the advertisement information storage unit 29 need not be constituted as a part of the server 12. The position of the advertisement information appending unit 30 is not particularly limited.

Specifically, when preparing a Web page containing advertisement information, an address indicating the storage location may be appended to image/text data transmitted from an image data processing device 11 of the user and having advertisement information appended thereto, and the resulting image/text data may be stored in a data storage unit 25. Alternatively, image/text data transmitted from the image data processing device 11 may be stored in the data storage unit 25, and when distributing this image/text data, advertisement information may be appended to the image/text data and thus transmitted.

The flow of distribution of advertisement information in the information distribution system 2 as a specific example of the present invention will now be described with reference to FIG. 10.

Figure 11:
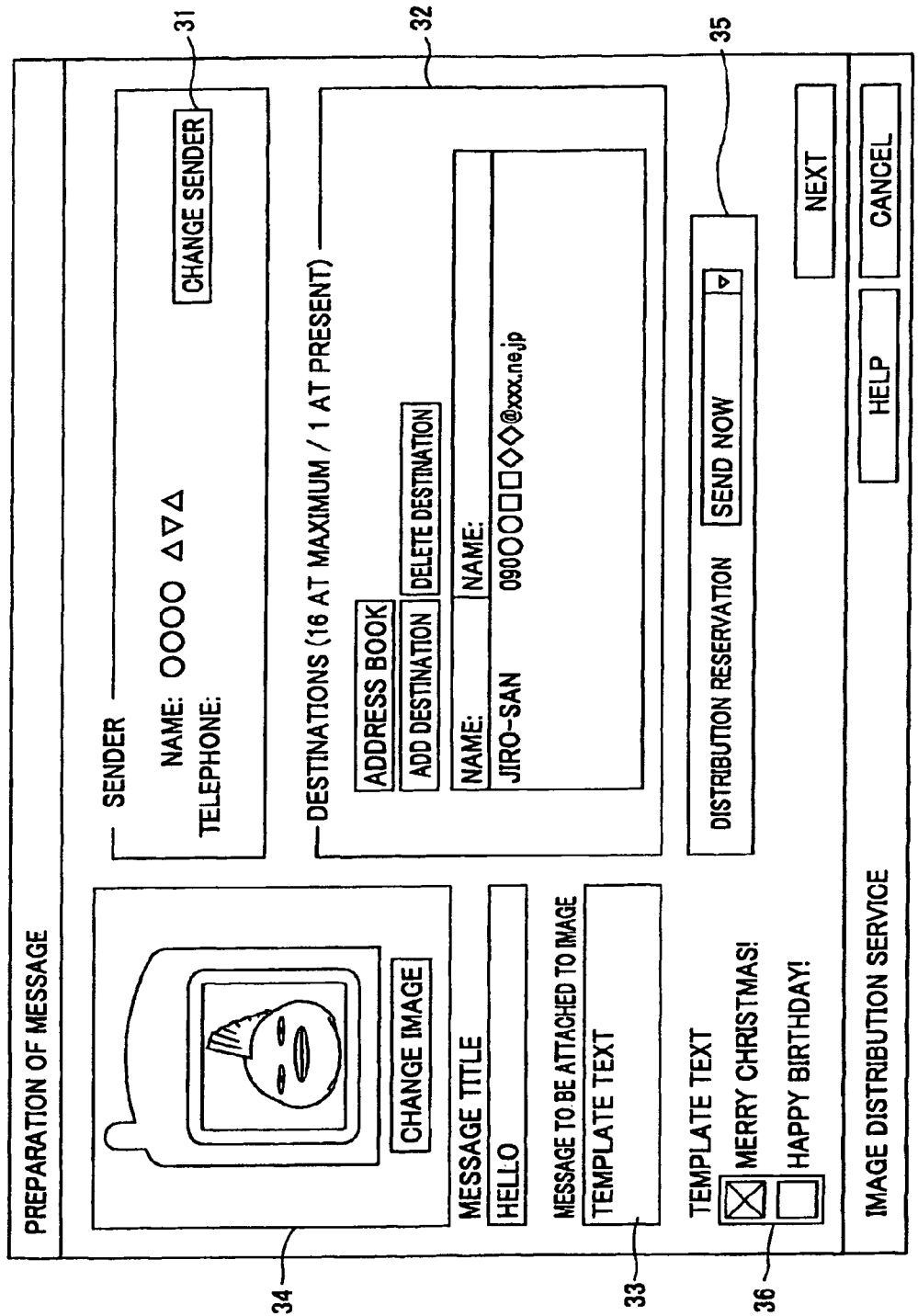
FIG. 11 is a view showing an exemplary image data processing GUI screen of an image data processing device in the information distribution system to which the present invention is applied.

First, the user prepares image/text data for distribution from desired image data and text data, using the image data processing device 11. FIG. 11 shows an exemplary GUI (graphical user interface) used as an image/text data preparation screen in the image data processing device 11 in this case.

On the GUI shown in FIG. 11, a sender change button 31 for switching to an input screen for inputting and/or changing the sender, a display section 32 for displaying the destination of distribution, an input section 33 for inputting a message to be attached to image data, and an image display section 34 for carrying out image display and image change are displayed. In addition to these, a distribution reservation section 35 for designating distribution timing, for example, whether data should be distributed right now or not, and a check box 36 for selecting a desired text from prepared template text options are displayed. The user edits image/text data which the user wants to distribute, on the GUI screen shown in FIG. 11.

When the user connects to the server 12 and transmits authentication ID and password that have been issued to the user in advance, the server 12 discriminates whether the user has been registered or not and authenticates the user.

After confirming that the user has been registered, the server 12 receives the image/text data, attaches advertisement information 90 based on user information to a confirmation notification (hereinafter referred to as result of transmission) to the effect that the image/text data has been received, and transmits the result of transmission to the user who sent the image/text data.

Figure 12:
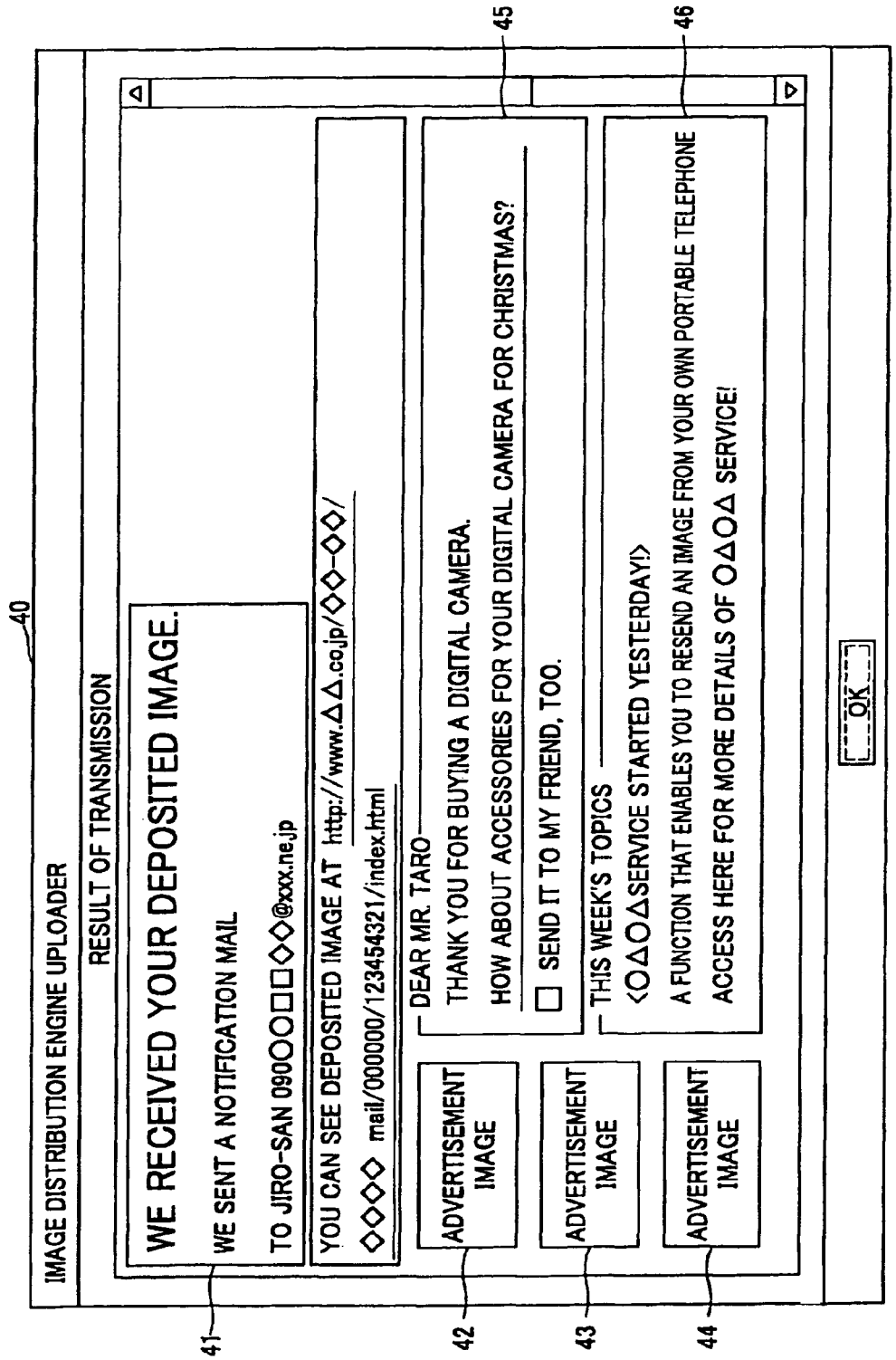
FIG. 12 is a view showing an exemplary image data processing GUI screen of the image data processing device in the information distribution system to which the present invention is applied.

FIG. 12 shows a Web screen transmitted as the result of transmission. In the result of transmission 40, a notification 41 to the effect that image/text data has been deposited is displayed, and an advertisement image 42, an advertisement image 43, an advertisement image 44, a text advertisement with a check box 45, and a text advertisement 46 are attached thereto. The attached advertisement information in this case is based on the user information. For example, the advertisement information includes advertisements of goods based on the gender and age of the user, advertisements of peripheral equipments of the digital image pickup device 17 and the personal computer owned by the user, and advertisements of goods based on the user's record of past purchase of goods.

In this case, the text advertisement with a check box 45 includes a check box for designating to "send it to my friend, too". If this check box is checked, a similar advertisement is attached to image/text data to be distributed to a recipient. In the information distribution system 2, if a template text prepared by the provider is selected as in the check box 36 or the text advertisement with a check box 45, advertisement information of a content related to the template text selected in the check box can be efficiently transmitted to a recipient, interlocked with this item. Moreover, by providing advertisement information that can be selected in accordance with a recipient to which the user wants to distribute image/text data, as in the text advertisement with a check box 45, information can be shared by the user and the distribution recipient.

Figure 10:
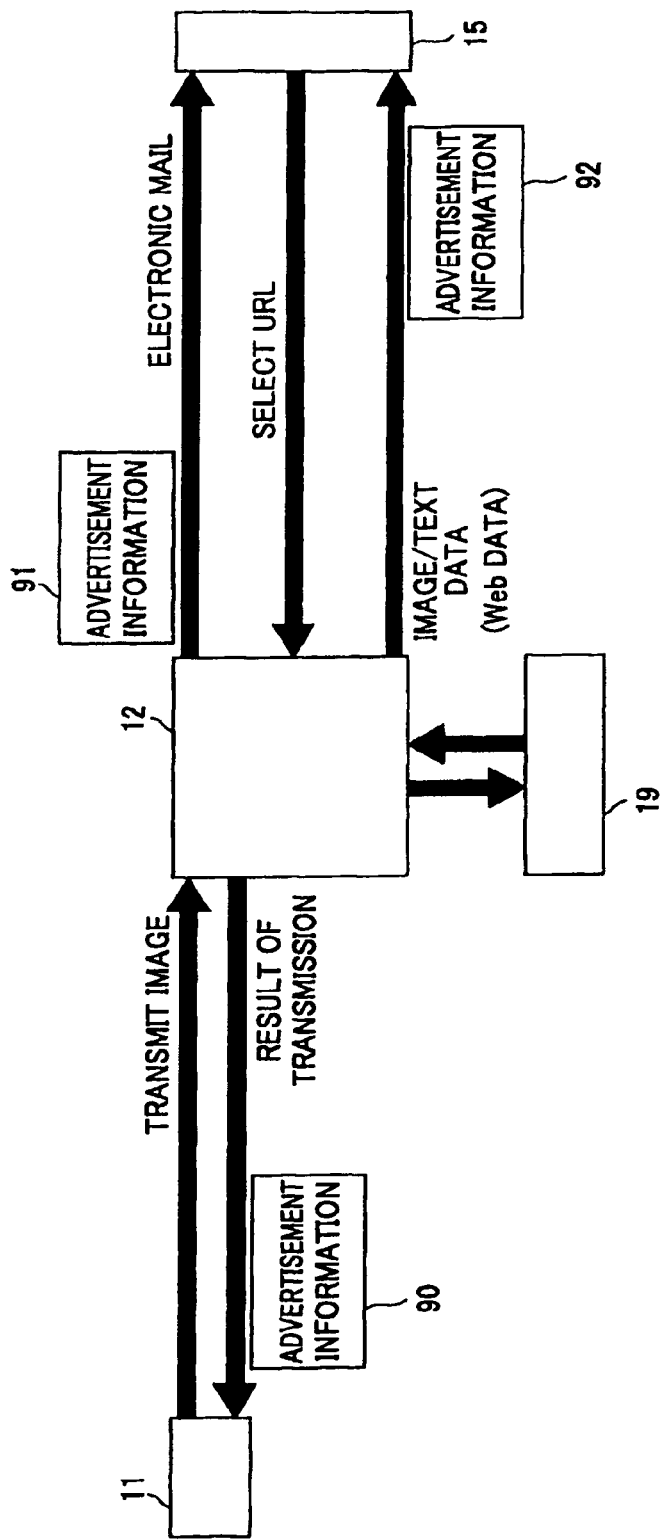
FIG. 10 is a schematic view for explaining the processing to append advertisement information in the information distribution system according to the present invention.

When the latest image/text data is transmitted from the user, the server 12 transmits a notification of image deposit including advertisement information 91 to the portable telephone unit 15 of the distribution recipient, as shown in FIG. 10.

Figure 9:
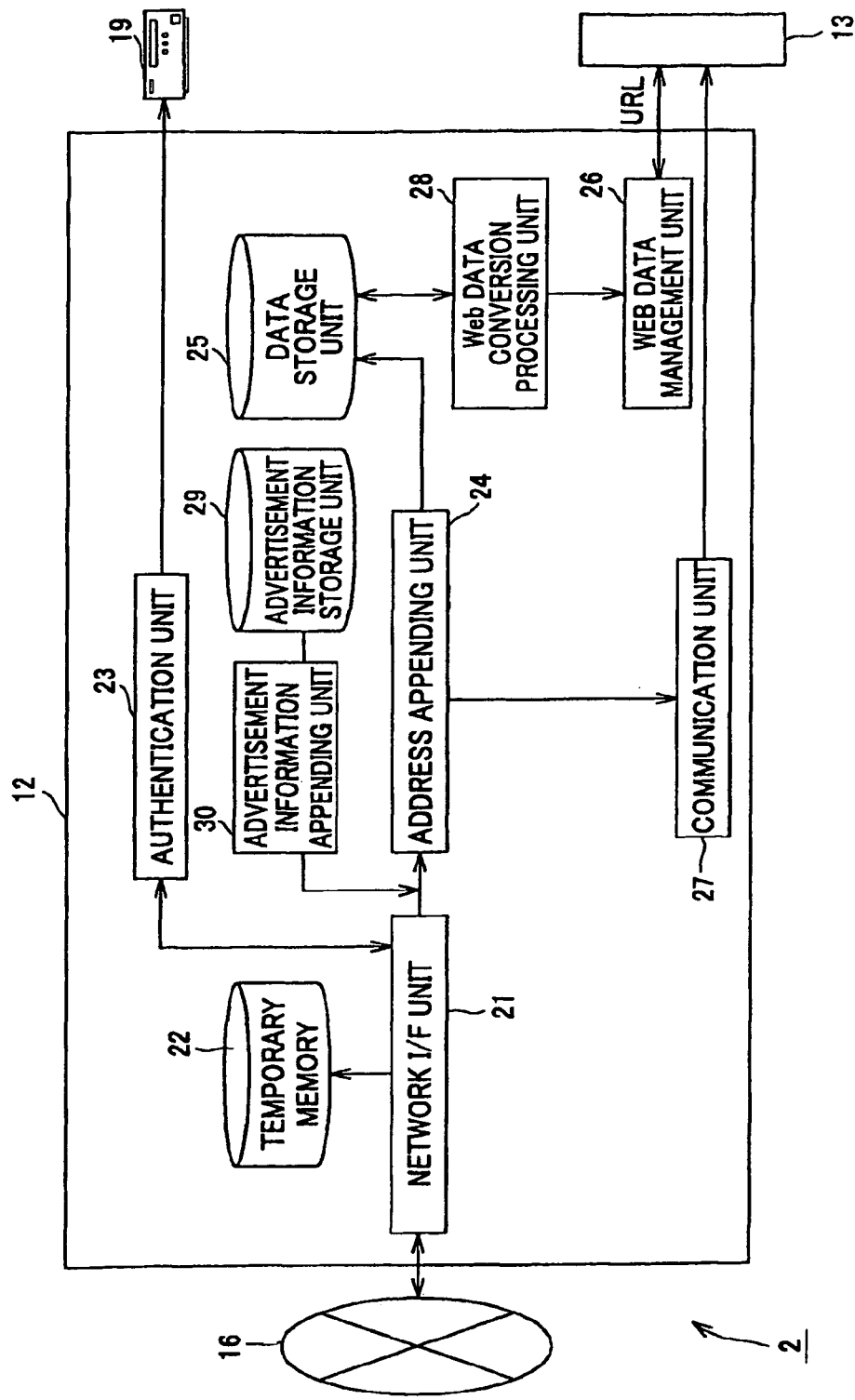
FIG. 9 is an explanatory view for explaining the structure of the server in the information distribution system to which the present invention is applied.
Figure 13:
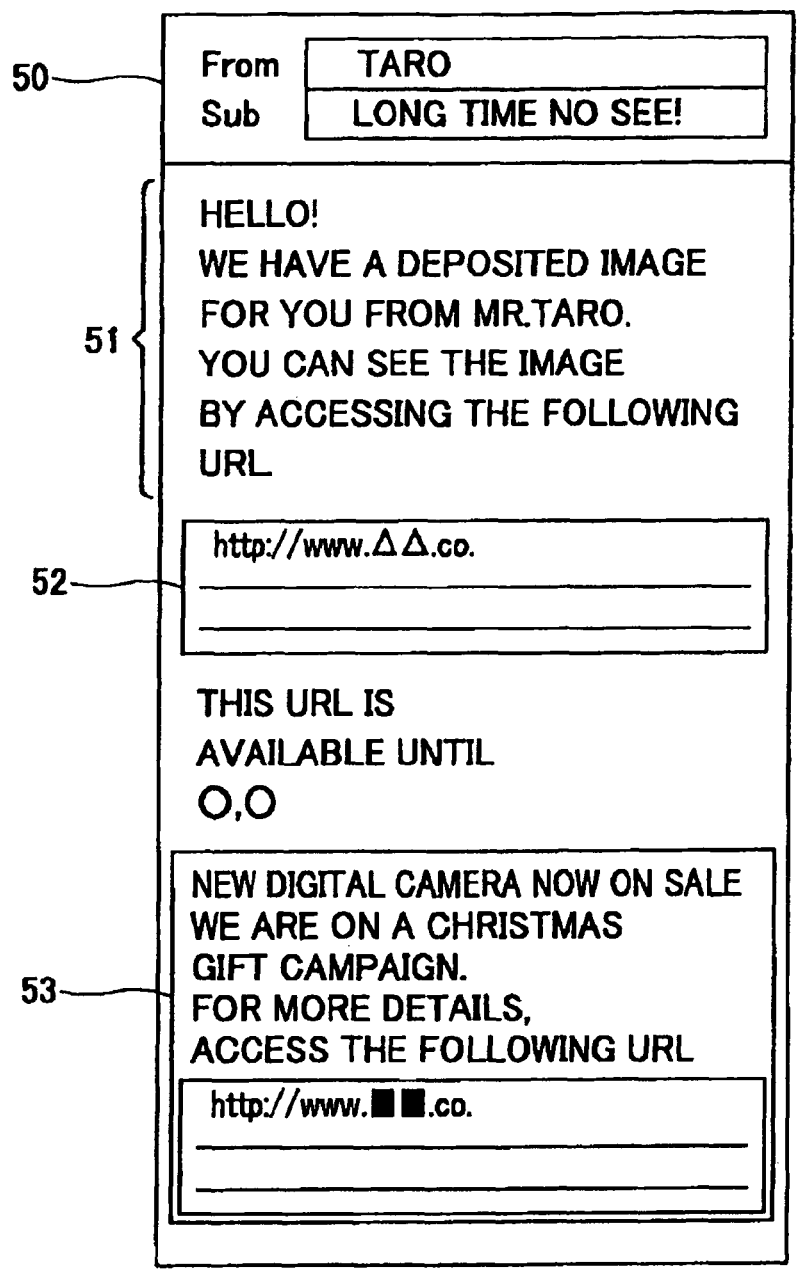
FIG. 13 is a view showing an exemplary screen structure that is transmitted to a portable radio communication terminal at a destination in the information distribution system according to the present invention.

FIG. 13 shows a deposit notification screen transmitted to the portable telephone unit 15 of the recipient. On a deposit notification screen 50, a message 51 to the effect that image/text data has been deposited from the user, and an URL 52 for viewing image/text data saved in the server 12 are displayed. Furthermore, a character advertisement 53 is attached to the deposit notification screen 50. This URL is a URL attached by the address appending unit 24 shown in FIGS. 2 and 9 and indicating the recording position of the image/text data in the data storage unit 25.

Moreover, a URL 54 indicating a Web page showing a detailed advertisement can be appended to the character advertisement 53. The distribution recipient can proceed to the Web page showing the detailed text advertisement, by selecting the URL 54.

By operating the portable telephone unit 15 to select the URL 52, the distribution recipient acquires the image/text data sent from the user using the portable telephone unit 15, as a Web page. As shown in FIG. 10, this Web page contains advertisement information 92.

Figure 14:
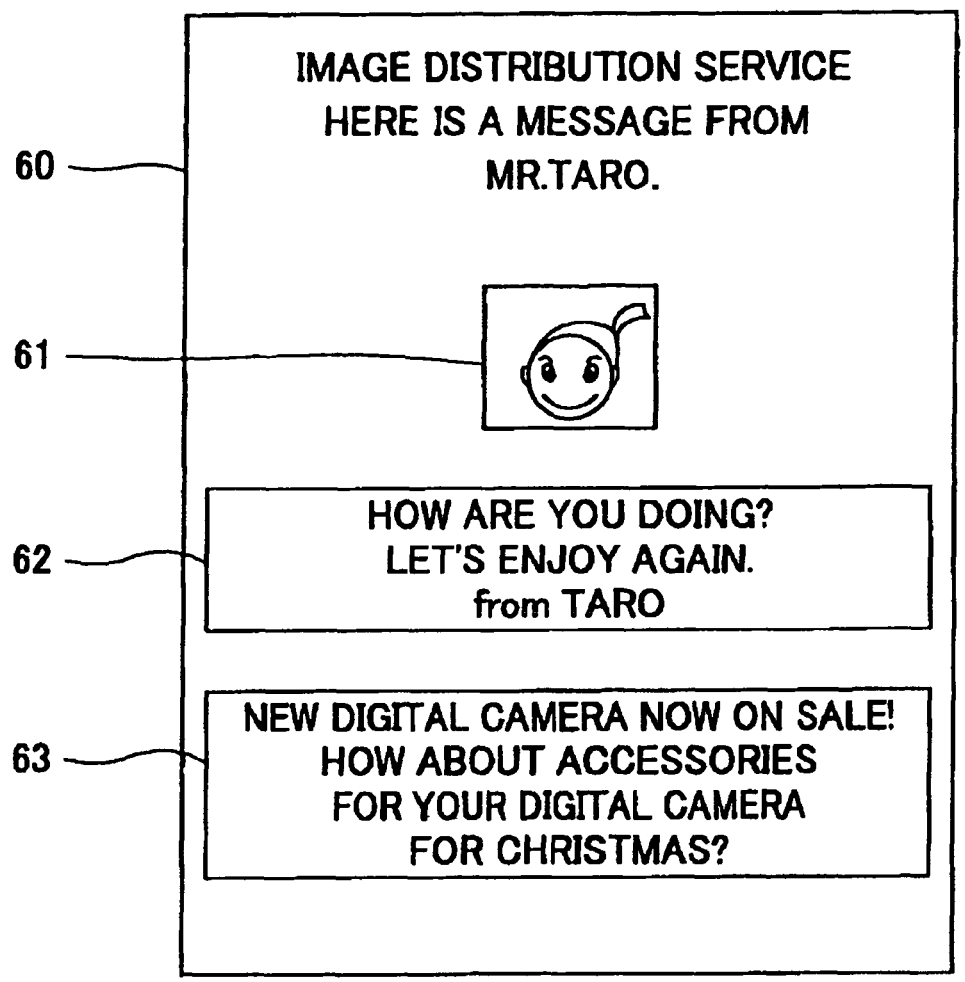
FIG. 14 is a view showing an exemplary screen structure that is transmitted to a portable radio communication terminal at a destination in the information distribution system according to the present invention.

FIG. 14 shows the Web page displayed in this case. On a Web page 60, image data 61 from the user 61, text data 62, and advertisement information 63 are displayed. In this case, the advertisement information 63 displayed on the Web page 60 is an advertisement based on the user's checking of the check box designating to "send it to my friend, too" on the result of transmission 40. However, it may also include other advertisement information.

In this manner, the information distribution system 2 can provide only necessary advertisement information for each individual by attaching advertisement information based on user information. Therefore, the advertising effect can be improved in comparison with distribution of certain advertisement information to many unspecified users.

In the information distribution system according to the present invention, as described above, when a user of the image data distribution system distributes, for example, image data processed by using a personal computer to a portable telephone unit, advertisement information is distributed to the user and the distribution recipient. However, the information distribution system can also be used as an image data distribution system which enables the user to access, retrieve, edit and retransmit image data from the user's portable telephone unit, with respect to the history of image data transmitted by the user using the image data processing device 11.

Figure 15:
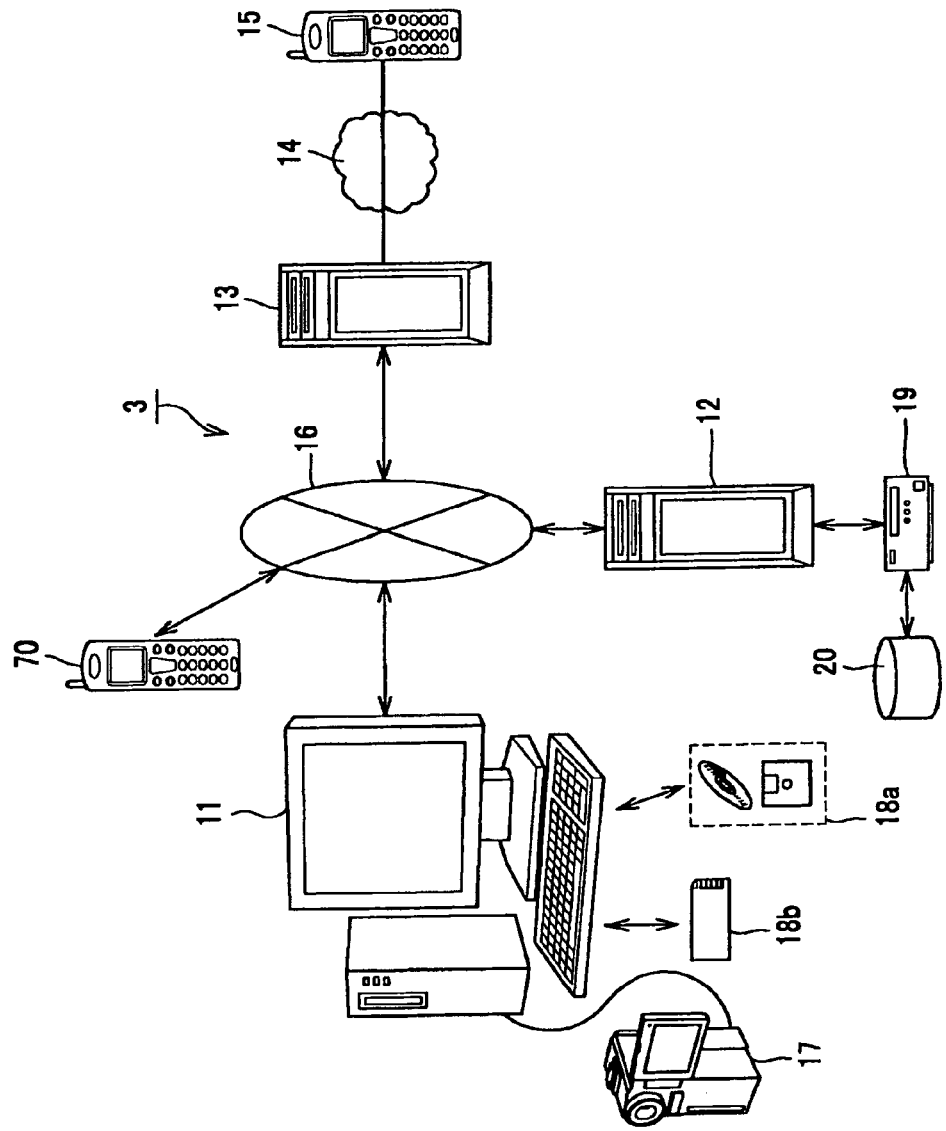
FIG. 15 is a structural view showing the schematic structure of an information distribution system to which the present invention is applied.

An information distribution system 3 as another specific example of the present invention has a user's portable telephone unit 70 in addition to the system structure shown in FIG. 1, as shown in FIG. 15, and it is characterized in that image/text data can be edited from the portable telephone unit 70 owned by the user. In the information distribution system 3 shown in FIG. 15, constituent elements having the same functions as those of the information distribution system 1 shown in FIG. 1 are denoted by the same numerals and will not be described further in detail.

In the information distribution system 3, using an image data distribution system that is made available by carrying out registration for use in advance, optimum advertisement information is distributed to the registered user and a recipient to whom the user wants to send image data, on the basis of the content of registration for use. The information distribution system 3 has the portable telephone unit 70, owned by the user, having a display unit for displaying an image data and a communication function, an image data processing device 11 having an image data processing function and a communication function, a server 12 for storing image data transmitted from the image data processing device 11, and a portable telephone base station 13 connected with a portable telephone unit 15 through a portable telephone communication network 14. It is assumed that the portable telephone unit 70 owned by the user is connected with a wire network 16 through a portable telephone communication network, similarly to the portable telephone unit 15. The wire network 16 is the so-called Internet.

The flow of information distribution in the above-described information distribution system 3 will be described with reference to FIGS. 16 and 17.

Figure 18:
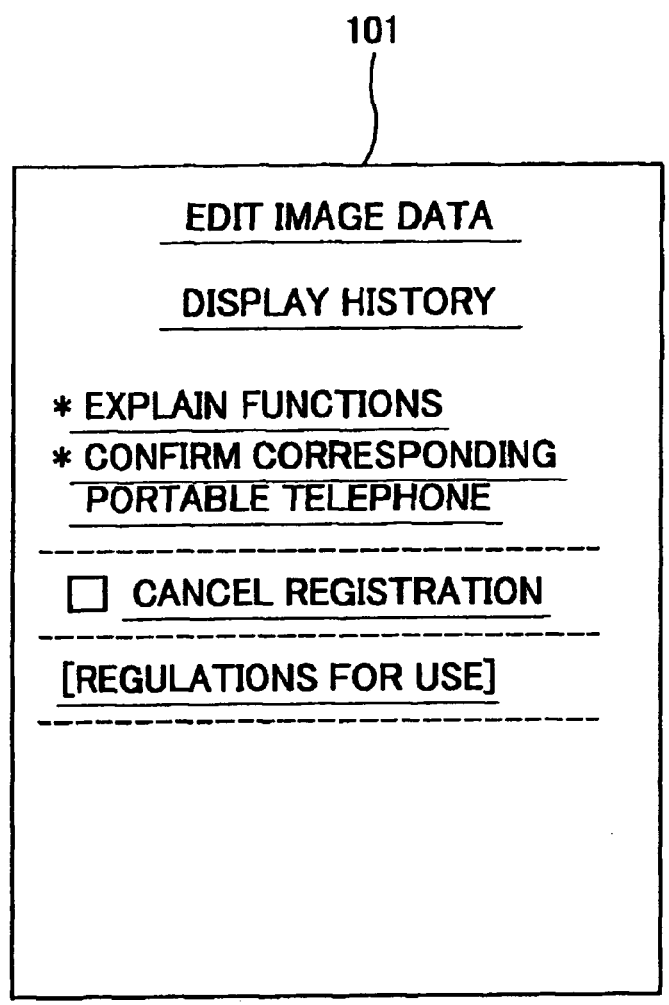
FIG. 18 is a view showing an exemplary top page screen that is transmitted to a user's portable radio communication terminal in the information distribution system according to the present invention.

The user connects to the server 12 by using the portable telephone unit 70. The user first accesses an information distribution service provision page, then selects a designated URL, and proceeds to the top page of the information distribution service (step S51). FIG. 18 shows an exemplary Web page of the image data distribution service displayed in this case. The portable telephone unit 70 acquires a top page 101 from the server 12.

Figure 19:
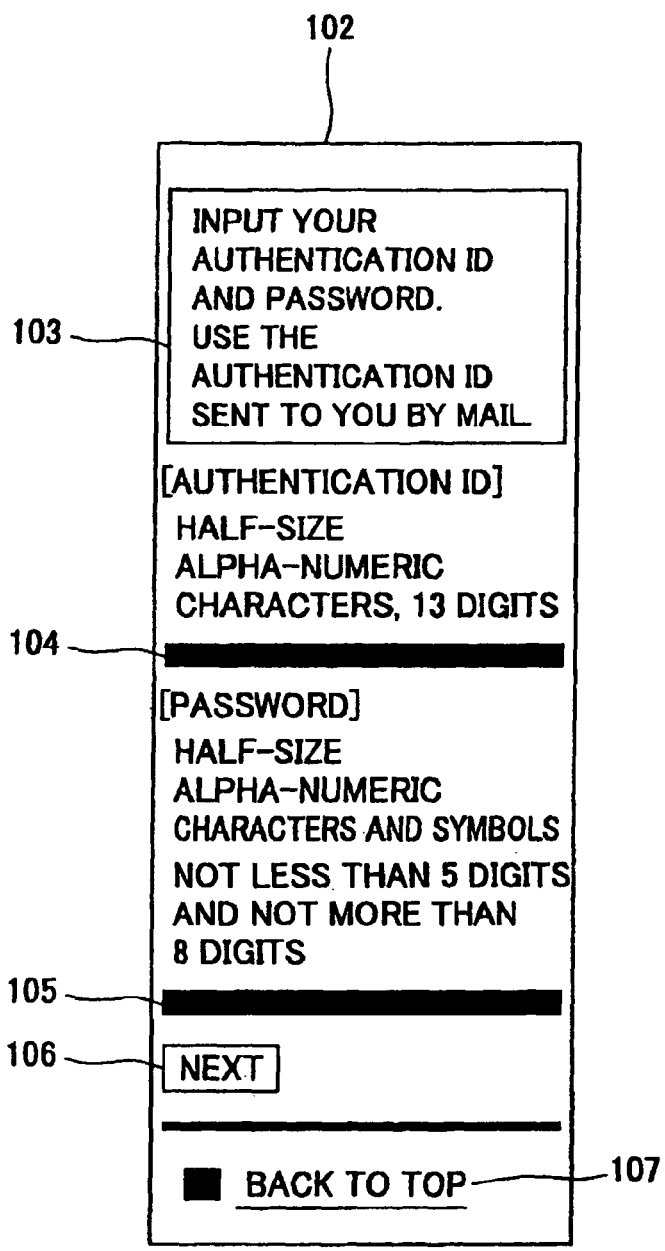
FIG. 19 is a view showing an exemplary authentication ID and password input screen that is transmitted to a user's

By selecting "Display history" on the top page 10 (step S52), the user can proceed to a registration authentication input display 102 of the image data distribution service shown in FIG. 19. In the registration authentication input display 102, a message 103 asking the user to input the authentication ID and password, an authentication ID input section 104, and a password input section 105 are displayed. Moreover, in the registration authentication input display 102, a "Next" button 106 to proceed and a back button 107 to return to the top page 101 are displayed.

Communication between the portable telephone unit 70 and the server 12 is secured by a function to encrypt texts to be transferred in a template style, for example, by a security technique such as SSL (Security Sockets Layer). Thus, the security of communication is realized by mutually confirming the signature, cipher and the like of the recipient (portable telephone unit 70) before the server 12 sends a text of a format supporting terminal of the distribution destination. Therefore, in this specific example, if the response is from a machine that does not support SSL, an error message as shown in FIG. 20 is displayed.

Figure 21:
FIG. 21 is a view showing an exemplary error message screen structure that is transmitted to a user's portable radio communication terminal in the information distribution system according to the present invention.
Figure 22:
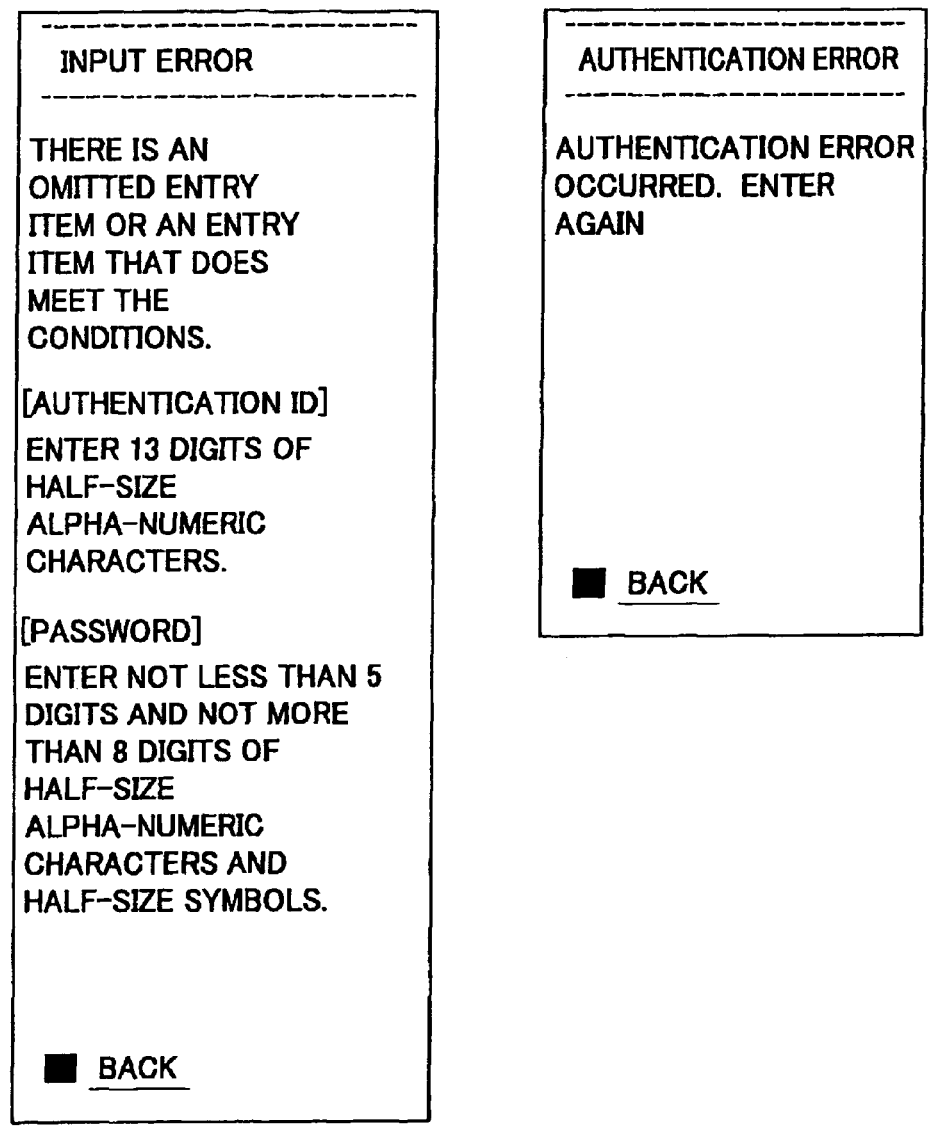
FIG. 22 is a view showing an exemplary error message screen structure that is transmitted to a user's portable radio communication terminal in the information distribution system to which the present invention is applied.

As entry in the authentication ID input section 104 and the password input section 105 is carried out by the user (step S53) and the authentication ID and password decided by the user's pressing the "Next" button 106 (step S54), the server 12 sends a deposited image list display 108 to the user's portable telephone unit 70 (step S55). If the user has not been registered to this service, the deposited image list display 108 is not presented. Moreover, in some cases, the deposited image list display 108 cannot be presented because of input errors in the authentication ID and password. In such cases, error messages shown in FIGS. 21 and 22 are displayed and the processing returns to step S53.

Figure 23:
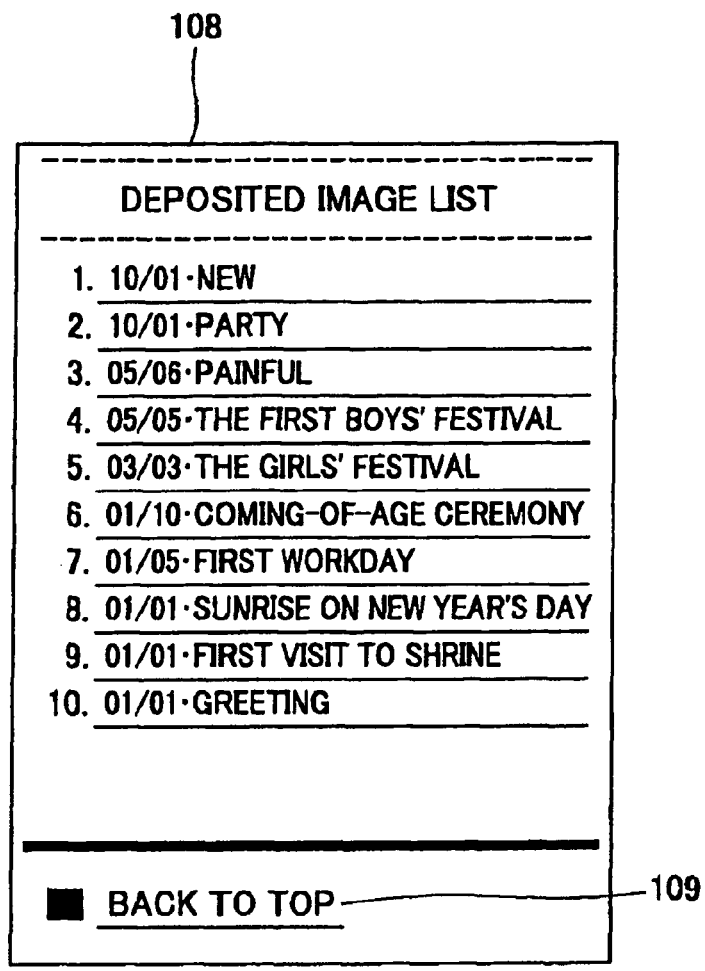
FIG. 23 is a view showing an exemplary deposited image list display screen that is transmitted to a user's portable radio communication terminal in still another exemplary information distribution system to which the present invention is applied.

FIG. 23 shows an exemplary deposited image display list. In the deposited image list display 108, a list showing display contents such as titles of image/text data that were distributed previously and a button 109 to return to the top page 101 are displayed. If the user selects one display content from the list showing display contents such as image/text data (step S56), the image/text data supporting the selected display content is displayed (step S57).

Figure 24:
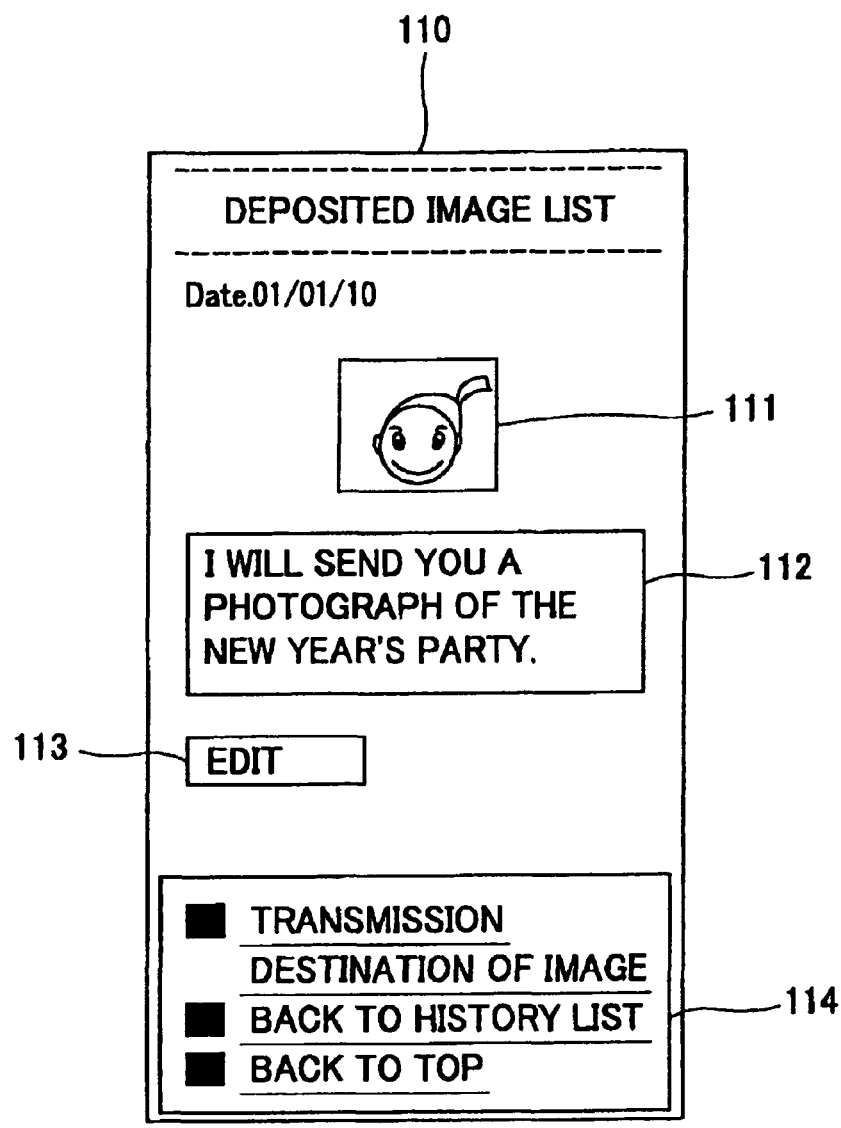
FIG. 24 is a view showing an exemplary image/text data screen selected from a deposited image list display screen that is transmitted to a user's portable radio communication terminal in still another exemplary information distribution system to which the present invention is applied.
Figure 25:
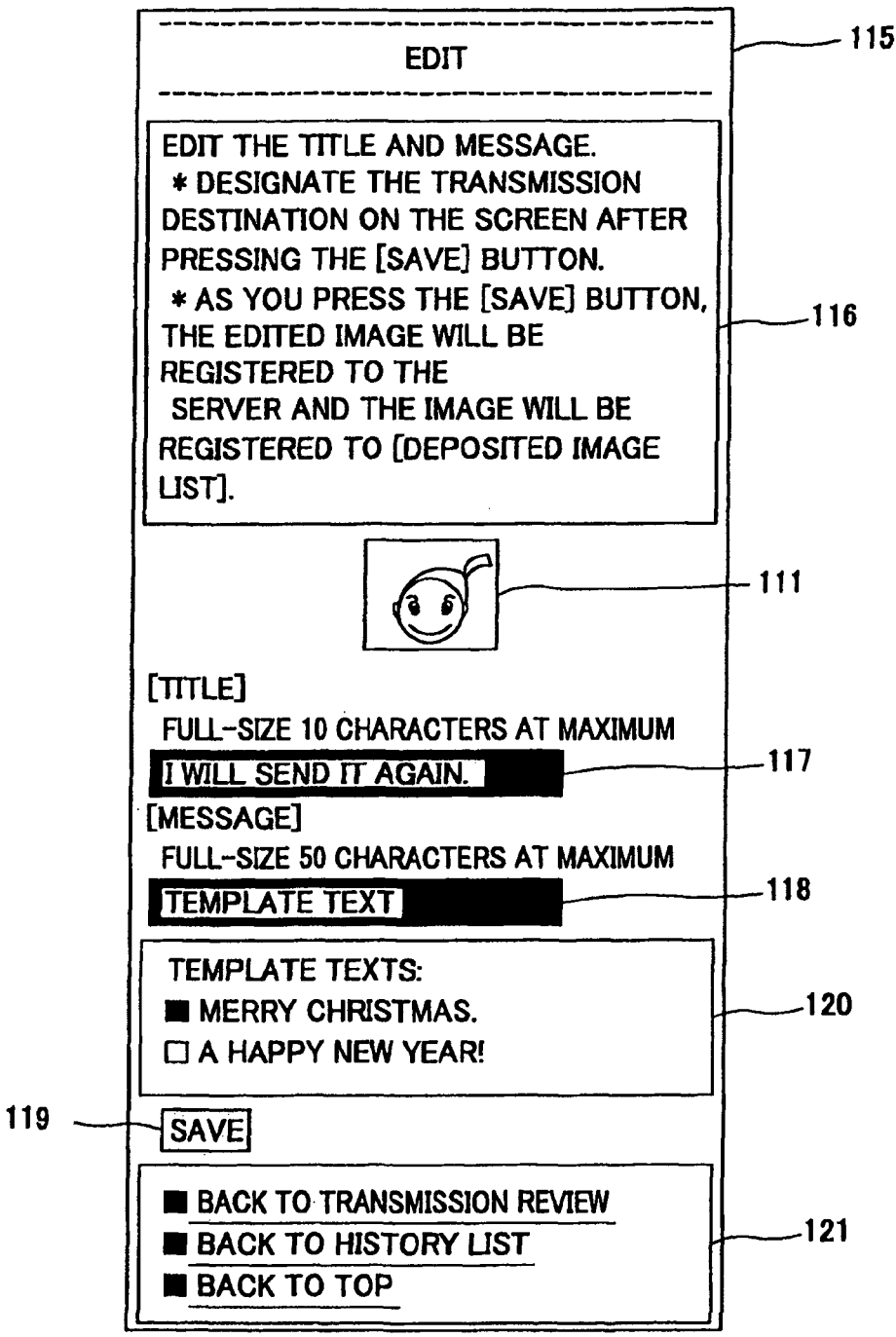
FIG. 25 is a view showing an exemplary editing screen that is transmitted to a user's portable radio communication terminal in still another exemplary information distribution system to which the present invention is applied.

FIG. 24 shows an example of image/text data 110 selected by the user. In the image/text data 110, image data 111, text data 112, an edit button 113 for editing these data, and selection buttons 114 for returning to the top page 101 and the previous page are displayed. If the edit button 113 is selected (step S58), an editing screen 115 shown in FIG. 25 appears (step S59).

In the editing screen 115, the image data 111, a message 116 for explaining operations, a title input section 117 for changing the title of this image/text data, and a message input section 118 are displayed. The user inputs contents to be modified in the title input section 117 and the message input section 118 by using the input part of the portable telephone unit 70, and selects a save button 119, thereby changing the title and message. In the editing screen 115, the user can also carry out simple editing of image data.

In addition, in the editing screen 115, plural template texts are prepared as texts with check boxes 120. If the user selects one of the texts with check boxes, the advertisement information appending unit 30 of the sever 12 attaches advertisement information corresponding to the content of the text. Moreover, selection buttons 121 for returning to the top page 101 and the deposited image list display 108 are displayed in the editing screen 115.

Figure 27:
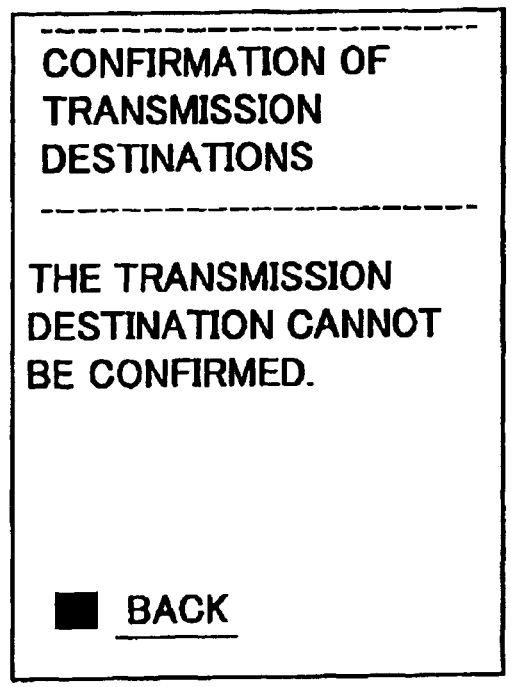
FIG. 27 is a view showing an exemplary transmission destination non-confirmation display screen that is transmitted to a user's portable radio communication terminal in still another exemplary information distribution system to which the present invention is applied.

If "transmission destination of image" is selected from the selection buttons 114 with the image/text data 110 displayed at step S57, the processing goes to step S60 and a transmission destination list shown in FIG. 26 is displayed. As a transmission destination is confirmed at step S61, the display returns to the image/text data 110. If the transmission destination has not been registered, the processing goes to step S62 and a transmission destination confirmation message shown in FIG. 27 is displayed. Then, the display returns to the image/text data 110.

Figure 16:
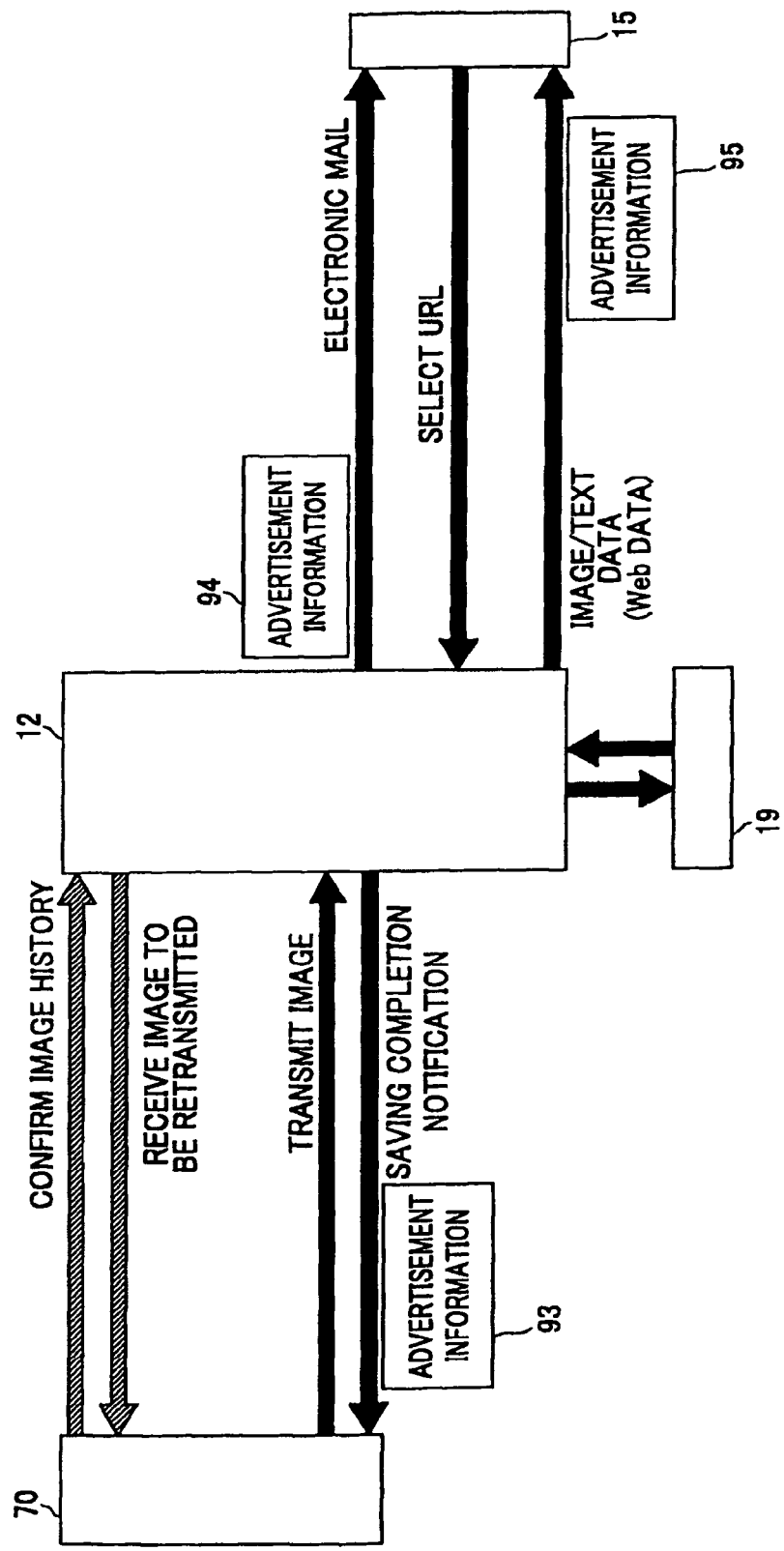
FIG. 16 is a schematic view for explaining the processing to append advertisement information in the information distribution system according to the present invention.
Figure 17:
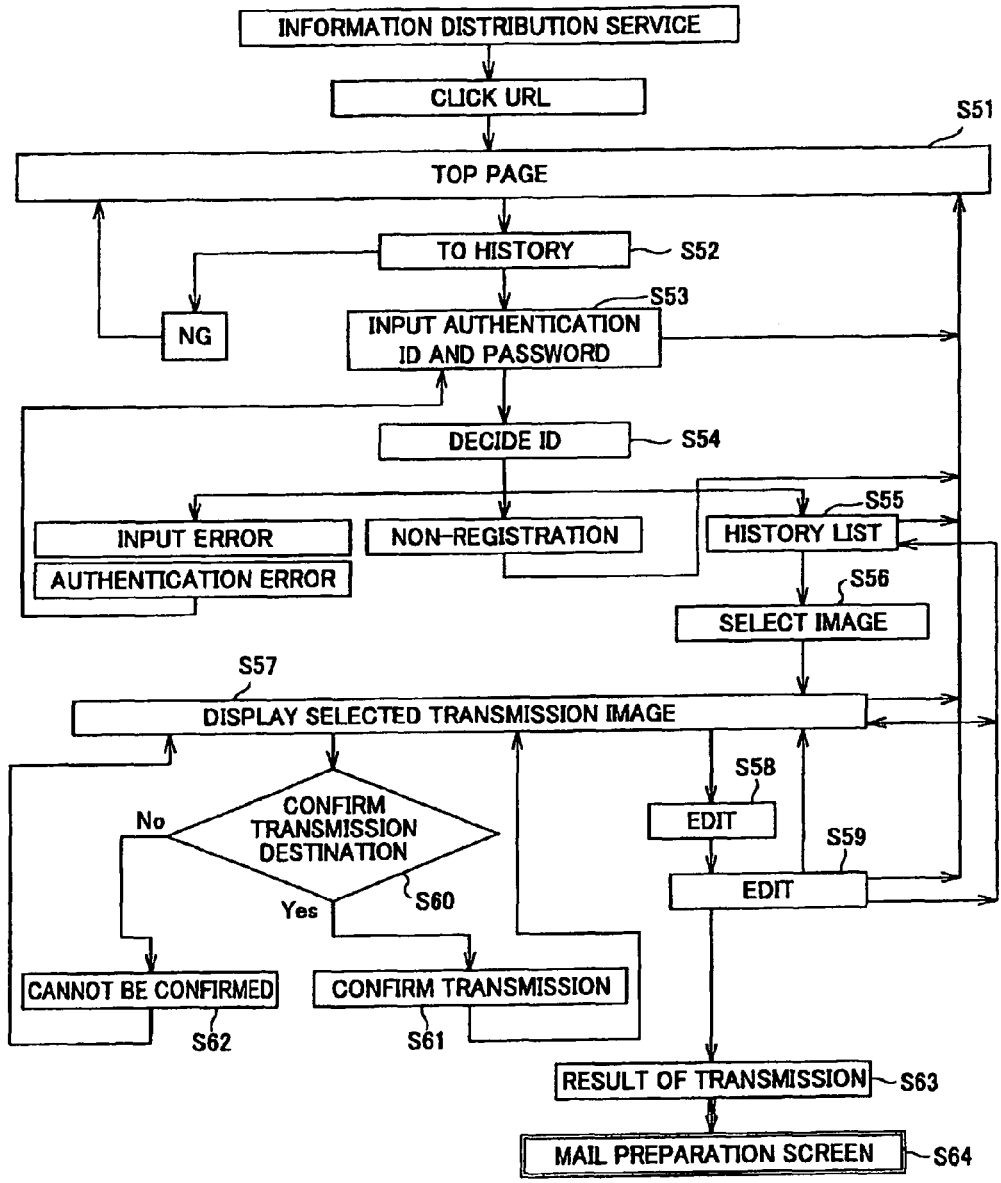
FIG. 17 is a flowchart for explaining the processing to edit image/text data saved into a server from a portable telephone unit in the information distribution system according to the present invention.

As the editing of the image/text data selected from the temporarily stored image/text data is completed by the above-described operations, the server 12 attaches advertisement information 93 to a saving completion notification to the effect that the image has been deposited, and sends it to the user's portable telephone unit 70 (step S63), as shown in FIG. 16.

Figure 28:
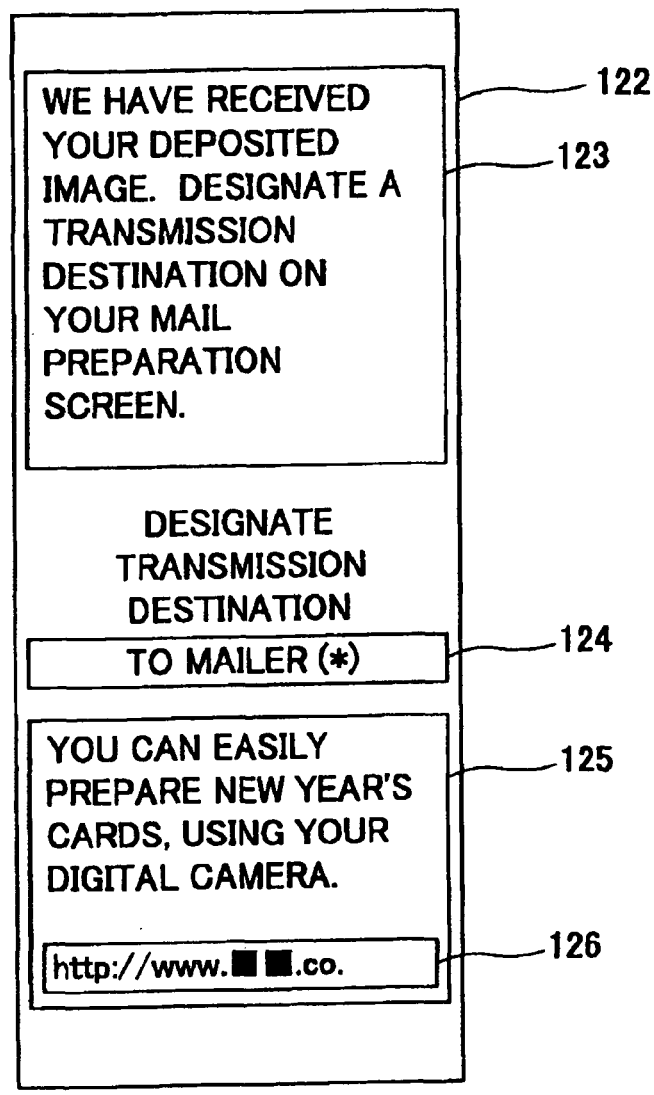
FIG. 28 is a view showing an exemplary saving completion notification screen that is transmitted to a user's portable radio communication terminal in still another exemplary information distribution system to which the present invention is applied.

FIG. 28 shows an exemplary saving completion notification 122. In the saving completion notification 122, a message 123 to the effect that image/text data has been deposited, and an input section 124 for designating a distribution destination of the saved image/text data are displayed. Moreover, advertisement information 125 extracted on the basis of user information is attached. A URL 126 showing the details of the advertisement information 125 may be attached to the advertisement information 125. The advertisement information 125 is equivalent to the advertisement information 93 of FIG. 16. The advertisement information 125 in this case is advertisement information extracted on the basis of the user information acquired from the user at the time of registration, that is, on the basis of the authentication ID and password of the user. The advertisement information 125 is advertisement information extracted from information based on gender and age of the user, peripheral equipments of the portable telephone unit 70 owned by the user, and the record of the user's purchase of goods in the past.

When selecting a distribution destination of the saved image/text data, the user can directly input the address of the distribution destination in the input section 124 or can select a so-called "mail-to" function defined as a standard of general portable telephone units.

Figure 29:
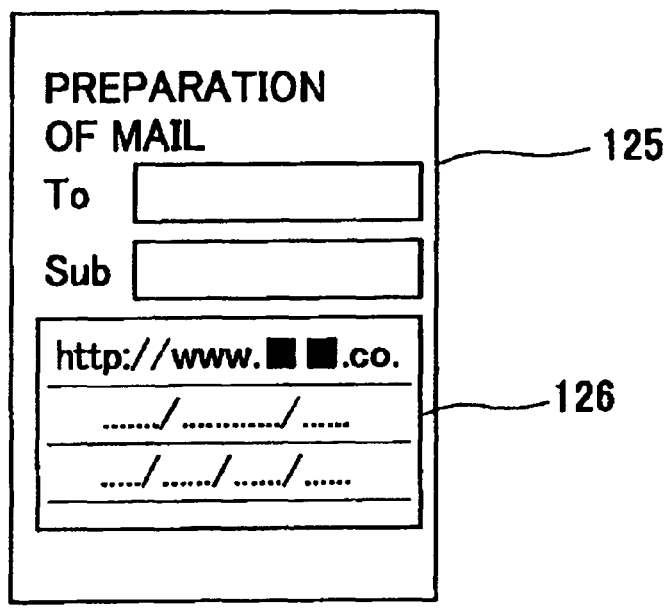
FIG. 29 is a view showing an exemplary mail preparation screen of a user's portable radio communication terminal in still another exemplary information distribution system to which the present invention is applied.

If the mail-to function is selected, the portable telephone unit will be in charge of controlling the subsequent input operation (step S64). An address storage function and a mail text preparation screen of the portable telephone unit are made available. As the mail-to function is selected, a mail text preparation screen as shown in FIG. 29 is displayed. That is, the control is shifted to the mail function of the portable telephone unit 70. In this case, in a mail preparation screen 125 shown in FIG. 29, a URL 126 indicating a new saving location of the edited image/text data is given and displayed. After that, the URL of the image/text data saved in the server 12 is transmitted to the distribution recipient by the ordinary mail function.

On the other hand, if the address of the distribution destination is directly inputted to the input section 124, a page having the screen structure shown in FIG. 13 is transmitted to the distribution recipient. In this case, advertisement information 94 can be attached, as shown in FIG. 16.

The distribution recipient can view the image/text data from the user, by selecting the URL transmitted thereto. Advertisement information 95 is attached to the image/text data acquired by the distribution recipient, as shown in FIG. 16. In this case, image/text data similar to that of FIG. 14 is sent to the distribution recipient.

In the case of an information processing terminal such as a personal computer, the user browse other displays while opening the Web page, by carrying out display operations such as changing the size of the display window or changing the location of the display window. However, in the case of an information processing terminal with a small display screen as in a portable telephone unit or an information processing terminal with poor display functions, the user must temporarily close the display window to view other displays.

For a user who has registered destination address such as e-mail addresses or the like to the address function of the portable telephone unit, an operation to input an address on a Web page is complicated.

In the information distribution system 3, the mail-to functions enables display of a URL indicating the saving location of image/text data in the server 12, in the ordinary mail preparation screen 125 of the portable telephone unit. Therefore, the address book provided as a function of the portable telephone unit can be used at the same time. The information distribution system according to the present invention can be suitably applied to an information processing terminal with a small display screen and an information processing terminal with poor display functions as well as a portable telephone unit.

With the information distribution system 3 to which the present invention is applied, it is possible to browse image/text data saved in the server 12, then edit and retransmit the image/text data, by using a portable telephone unit having no function to edit image/text data of a Web page or the like.

In the above-described top page 101, not only "display history" but also "explain functions", "confirm supporting machine type (SSL confirmation)" and "cancel registration" can be selected. The processing in the case where these are selected will be described hereinafter.

Figure 30:
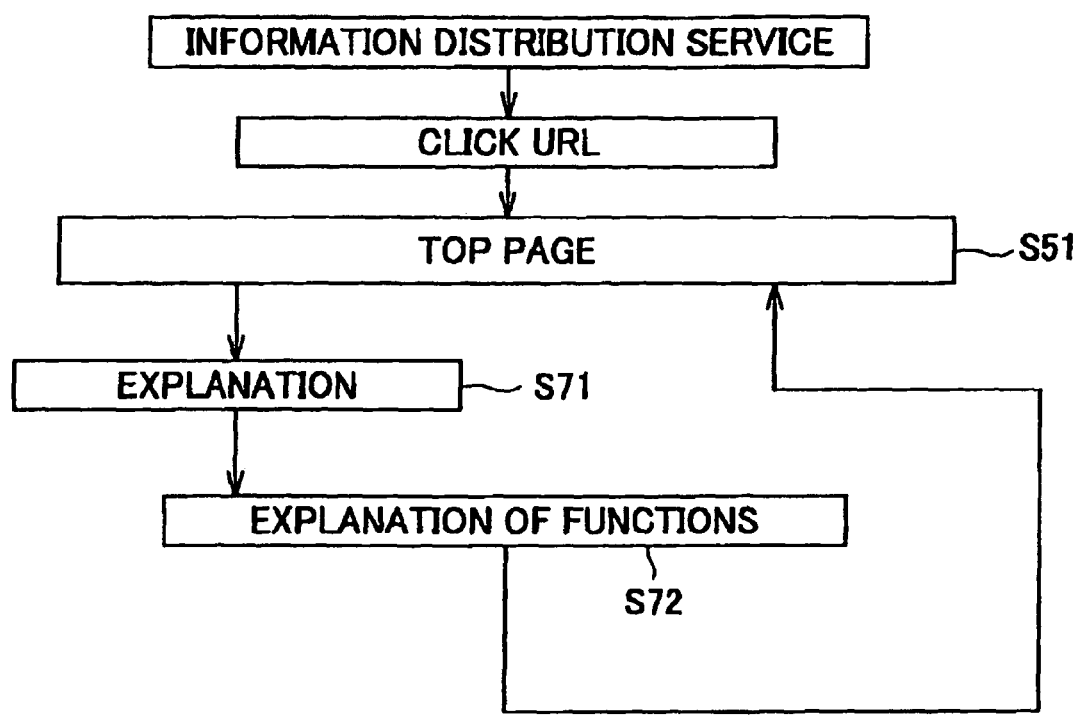
FIG. 30 is a flowchart for explaining the flow of explanation of functions of an information distribution service in still another exemplary information distribution system to which the present invention is applied.

If "explain functions" is selected in the top page 101 shown in FIG. 18, the processing shown in FIG. 30 is carried out. That is, when "explain functions" is selected (step S71), a function explanation screen is displayed (step S72) and the display can return to the top page 101 by a return operation.

Figure 31:
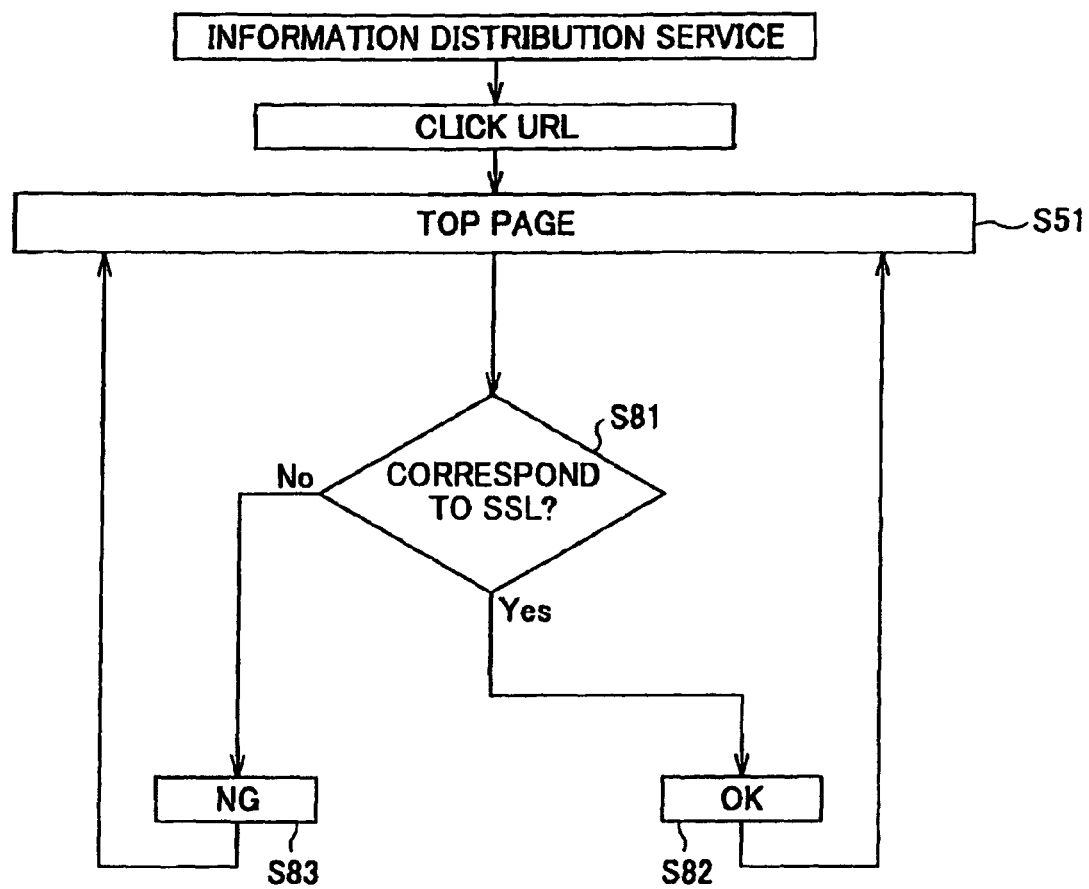
FIG. 31 is a flowchart for explaining the flow of confirmation of machine type of an information distribution service in still another exemplary information distribution system to which the present invention is applied.

If "confirm supporting machine type" is selected in the top page 101 shown in FIG. 18 (step S81), the processing shown in FIG. 31 is carried out. If the machine type of the user's portable telephone unit 70 supports SSL, a message to the effect that the machine type supports SSL is displayed at step S82. If the machine type does not support SSL, the error message shown in FIG. 20 is displayed at step S83.

Figure 32:
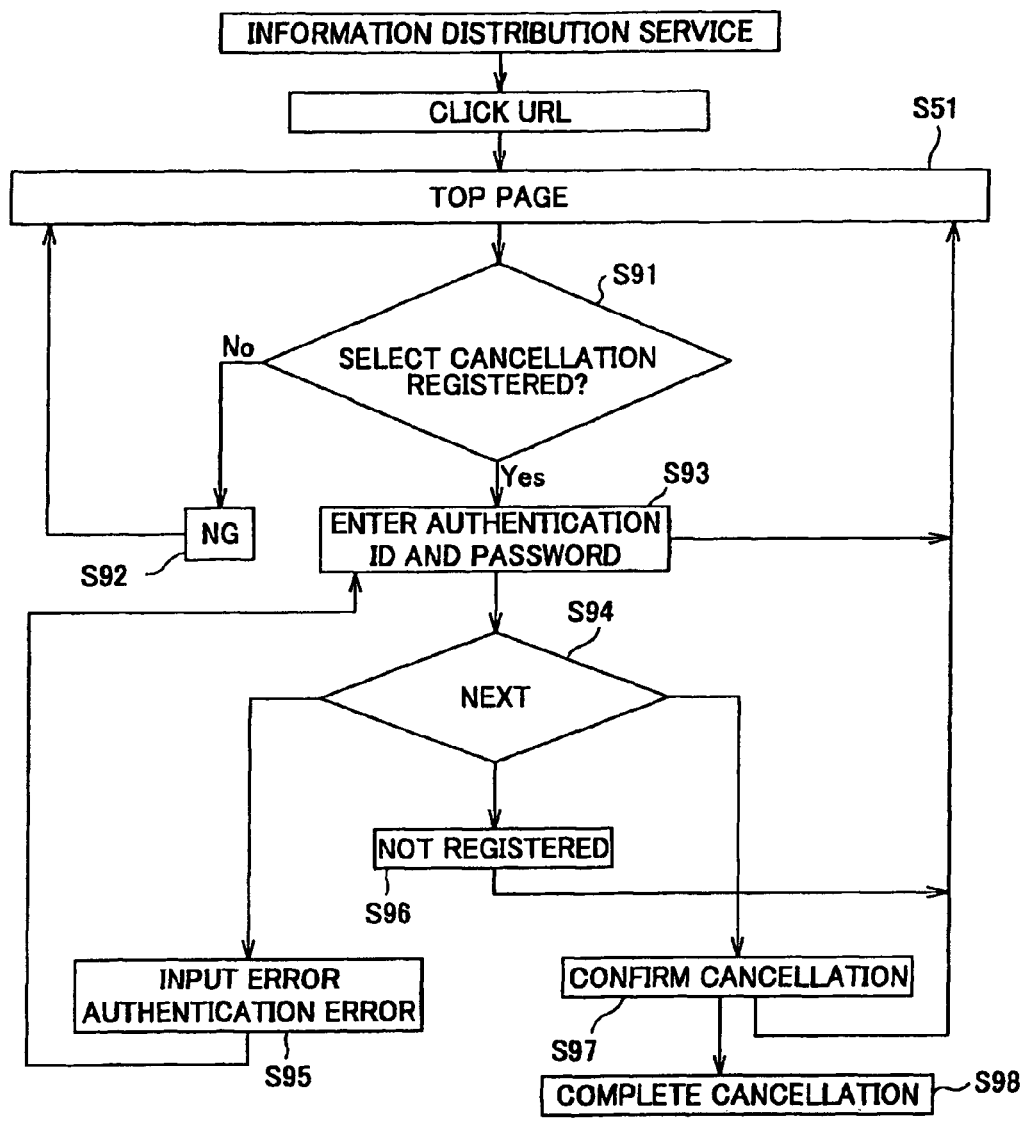
FIG. 32 is a flowchart for explaining the flow of cancellation of registration of an information distribution service in still another exemplary information distribution system to which the present invention is applied.

If "cancel registration" is selected, the processing shown in FIG. 32 is carried out. When "cancel registration" is selected (step S91), if registration has not been made, the message shown in FIG. 21 is displayed at step S92. If registration has been made, the user is prompted to input the authentication ID and password at step S93.

Figure 33:
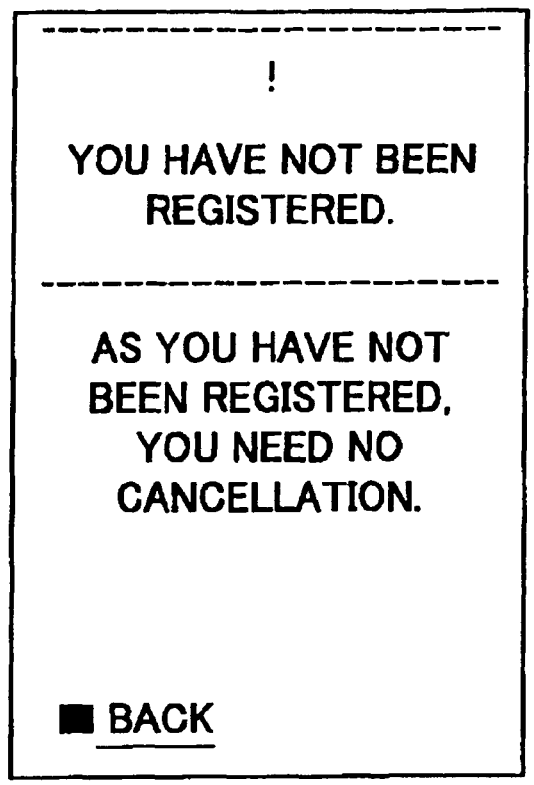
FIG. 33 is a view showing an exemplary screen structure that is transmitted to a user's portable radio communication terminal in still another exemplary information distribution system to which the present invention is applied.

When the authentication ID and password are inputted, the authentication ID and password are confirmed at step S94. In the case of an input error, the error message shown in FIG. 22 is displayed at step S95. If no registration has been made, a message shown in FIG. 33 to the effect that no registration has been made is displayed at step S96. As the authentication ID and password are confirmed, cancellation of registration is confirmed at step S97 and cancellation of registration is completed at step S98.

It is to be noted that the present invention is not limited to the above-described embodiments. As a matter of course, various modifications can be made without departing from the scope of the present invention. The portable communication terminal in the present invention may be any portable communication terminal having a data processing function and a communication function, such as a PDA (personal digital assistant) and a portable personal computer, and is not limited to a portable telephone unit. The screen displays used in the above description are examples and the displaying manner is not limited.

Even in the case of communication between general information processing terminals, by editing Web data temporarily uploaded to the server and saving a new Web page after editing, the server can transmit a command to start the mail-to function using the URL of the Web page as an argument, to the information processing terminal.

As described above, also in the information distribution system 3 shown in FIG. 15, the advertisement effect can be improved more by attaching advertisement information based on user information, than by distributing unnecessary advertisement information to many unspecified users.

In addition to advertisement information based on user information as described above, advertisement information may be attached in accordance with keywords extracted from information transmitted and received between the user and the distribution recipient.

INDUSTRIAL APPLICABILITY

An information distribution system according to the present invention comprises: an image data processing terminal having display means for displaying image data, and image data transmission means for transmitting the image data to outside; an information providing device having image data saving means for saving the image data, and address information appending means for appending to the image data a destination address for referring to the image data from outside; and a portable radio communication terminal having image data acquisition means for acquiring the image data with the destination address appended thereto, and display means for displaying the image data; the information distribution system having an image data distribution function for distributing the image data from the image data processing terminal to the portable communication terminal; wherein connection from the image data processing terminal is identified using identification information issued at the time of registration, and optimum content information is extracted from content information storage means on the basis of user information stored in storage means for storing the identification information and user information corresponding to the identification information and is attached to the image data, which is then transmitted.

With the information distribution system according to the present invention, useful content information for each user can be distributed and specified information can be shared by users. Therefore, more useful content information can be distributed on the basis of the information between the users An information distribution system according to the present invention comprises: a first information processing terminal having data transmission/reception means for transmitting and receiving data; an information providing device having data saving means for saving the data, and address information appending means for appending to the data a destination address for referring to the data from outside; and a second information processing terminal having data acquisition means for acquiring the data with the destination address appended thereto, and display means for displaying the data; the information distribution system having an image data distribution function for distributing the data from the first information processing terminal to the second information processing terminal; wherein optimum content information is extracted from content information storage means on the basis of the content of information transmitted and received between individual users and is attached to the image data, which is then transmitted.

With the information distribution system according to the present invention, unnecessary content distribution is reduced and useful content information for each user can be distributed. Specified information can be shared by users and content information can be exchanged between users. Therefore, more useful content information can be distributed.

An information distribution method according to the present invention comprises: a display step of displaying image data at an image data processing terminal; an image data transmission step of transmitting the image data to outside; an information providing step including an image data saving step of saving the image data, and an address information appending step of appending to the image data a destination address for referring to the image data from outside; an image data acquisition step of acquiring the image data with the destination address appended thereto at a portable radio communication terminal; and a display step of displaying the image data; the information distribution method having an image data distribution function for distributing the image data from the image data processing terminal to the portable communication terminal; wherein connection from the image data processing terminal is identified using identification information issued at the time of registration, and at a content information providing step, optimum content information is extracted on the basis of user information stored in storage means for storing the identification information and user information corresponding to the identification information and is attached to the image data, which is then transmitted.

With the information distribution method according to the present invention, unnecessary content distribution is reduced and useful content information for each user can be distributed. Specified information can be shared by users and content information can be exchanged between users. Therefore, more useful content information can be distributed.

An information distribution method according to the present invention comprises: a data transmission/reception step of transmitting data at a first information processing terminal; an information providing step including a data saving step of saving the data, and an address information appending step of appending to the data a destination address for referring to the data from outside; and a data acquisition step of acquiring the data with the destination address appended thereto and a display step of displaying the data at a second information processing terminal; the information distribution method having an image data distribution function for distributing the data from the first information processing terminal to the second information processing terminal; wherein optimum content information is extracted from content information storage means on the basis of the content of information transmitted and received between individual users and is attached to the image data, which is then transmitted.

With the information distribution method according to the present invention, unnecessary content distribution is reduced and useful content information for each user can be distributed. Specified information can be shared by users and content information can be exchanged between users. Therefore, more useful content information can be distributed.

An information providing device according to the present invention comprises: image data transmission/reception means for transmitting and receiving image data from an image data processing terminal through a network; image data saving means for saving the received image data; address information appending means for appending to the image data a destination address for referring to the image data from the outside; storage means for storing user information; content information storing means for storing content information; and content information attaching means for attaching the content information to the image data on the basis of the user information; wherein content information selected on the basis of user information identifying the user is transmitted to the user.

In such an information providing device, connection from the image data processing terminal is identified using identification information issued at the time of registration, and optimum content information is extracted on the basis of the user information stored in the storage means for storing the identification information and the user information corresponding to the identification information and is attached to the image data, which is then transmitted.

Therefore, with the information providing device according to the present invention, unnecessary content distribution is reduced and useful content information for each user can be distributed. Specified information can be shared by users and content information can be exchanged between users. Therefore, more useful content information can be distributed.

An information providing method according to the present invention comprises: an image data transmission/reception step of transmitting and receiving image data from an image data processing terminal through a network; an image data saving step of saving the received image data; an address information appending step of appending to the image data a destination address for referring to the image data from outside; a storage step of storing user information; and a content information attaching step of attaching content information to the image data on the basis of the user information; wherein content information selected on the basis of user information identifying the user is transmitted to the user.

In such an information providing method, connection from the image data processing terminal is identified using identification information issued at the time of registration, and optimum content information is extracted on the basis of the user information stored in storage means for storing the identification information and the user information corresponding to the identification information and is attached to the image data, which is then transmitted.

Therefore, with the information providing method according to the present invention, unnecessary content distribution is reduced and useful content information for each user can be distributed. Specified information can be shared by users and content information can be exchanged between users. Therefore, more useful content information can be distributed.

The invention claimed is:

1. An information providing device comprising:
    image data transmission/reception unit transmitting and receiving image data from image data processing terminals of users through a network;
    image data saving hardware saving the received image data;
    address information appending unit appending, to said image data, a destination address for referring to said image data from outside;
    storage medium storing user information;
    content information storing hardware storing advertisement content information; and
    content information attaching unit attaching said advertisement content information to said image data;
    wherein said advertisement content information, selected on the basis of said user information identifying said user, is transmitted to said image data processing terminal of said user and displayed, on said image data processing terminal of said user, with a notification indicating that the image data has been received from the user and GUI (graphical user interface) information to designate said advertisement information by said user;
    wherein said image data transmission/reception unit transmits said image data to said image data processing terminal of another user, wherein said image data is (a) stored at the destination address, and (b) attached with said advertisement content information designated by said user.

2. The information providing device as claimed in claim 1, wherein advertisement content information is attached to said image data and is transmitted therewith.

3. The information providing device as claimed in claim 1, wherein said advertisement content information contains a destination address of a saving portion where details of predetermined information, image information or character information are saved.

4. The information providing device as claimed in claim 1, further comprising identification unit identifying connection from said image data processing terminal by using identification information,
    wherein said storage medium stores said user information and said identification information in association with each other.

5. The information providing device as claimed in claim 1, wherein said image data is data comprising image data and text data.

6. The information providing device as claimed in claim 1, wherein said image data is converted, at said image data processing terminal, to a display size and file format corresponding to the image display ability of a distribution destination and is saved.

7. The information providing device as claimed in claim 5, wherein said file format is the GIF (graphics interchange format) format.

8. The information providing device as claimed in claim 7, wherein said text data contains text data with user selectable text options, and content information attaching unit attaches advertisement content information to said image data in accordance with information contained in a selected text.

9. The information providing device as claimed in claim 7, wherein said image data is data of the HTML (Hypertext Markup Language) format.

10. The information providing device as claimed in claim 1, wherein said destination address is a URL (uniform resource locator).

11. The information providing device as claimed in claim 1, wherein said advertisement content information is advertisement information.

12. The information providing device as claimed in claim 1, wherein said GUI information is for displaying a check box.

13. An information providing method comprising:
transmitting and receiving image data from image data processing terminals of users through a network;
saving the received image data;
appending, to said image data, a destination address for referring to said image data from outside;
storing user information; and
attaching advertisement content information to said image data;
wherein said advertisement content information, selected on the basis of the user information identifying said user, is transmitted to said image data processing terminal of said user and displayed, on said image data processing terminal of said user, with a notification indicating that the image data has been received from the user and GUI (graphical user interface) information to designate said advertisement information by said user;
wherein said transmitting and receiving step transmits said image data to said image data processing terminal of another user, wherein said image data is (a) stored at the destination address, and (b) attached with said advertisement content information designated by said user.

14. The information providing method as claimed in claim 13, wherein advertisement content information is attached to said image data and is transmitted therewith.

15. The information providing method as claimed in claim 13, wherein said advertisement content information contains a destination address of a saving location where details of predetermined information, image information or character information are saved.

16. The information providing method as claimed in claim 15, wherein said destination address is a URL (uniform resource locator).

17. The information providing method as claimed in claim 13, further comprising step of identifying connection from said image data processing terminal by using identification information,
wherein at said storing step, said user information and said identification information are stored in association with each other.

18. The information providing method as claimed in claim 13, wherein said image data is data comprising image data and text data.

19. The information providing method as claimed in claim 13, wherein said image data is converted, at said image data processing terminal, to a display size and file format corresponding to the image display ability of a distribution destination and is saved.

20. The information providing method as claimed in claim 19, wherein said file format is the GIF (graphics interchange format) format.

21. The information providing method as claimed in claim 20, wherein said text data contains text data with user selectable text options, and at said content information attaching step, advertisement content information is attached to said image data in accordance with information contained in a selected text.

22. The information providing method as claimed in claim 20, wherein said image data is data of the HTML (Hypertext Markup Language) format.

23. The information providing method as claimed in claim 13, wherein said advertisement content information is advertisement information.

24. The information providing method as claimed in claim 13, wherein said GUI information is for displaying a check box.

25. An information providing method comprising the steps of:
authenticating a user based on identification information of said user;
receiving, on a server, image data transmitted from a first image data processing terminal of said user, wherein said image data is to be distributed to a second data processing terminal of a recipient different from said user, by said server;
transmitting a notification of receiving said image data to said first image data processing terminal of said user;
transmitting advertisement information to said first image data processing terminal of said user based on user information of said user, wherein said advertisement information is displayed with said notification of receiving of said image on said first image data processing terminal of said user, wherein GUT (graphical user interface) information to designate said advertisement information by said user is attached to said advertisement information by said server; and
providing said image data and said advertisement information designated by said user to said second data processing terminal of said recipient.

26. The information providing method as claimed in claim 25, further comprising step of:
transmitting a notification notifying said image received from said first image data processing terminal of said user to said second data processing terminal of said recipient,
wherein said notification includes a destination address of a saving location where said image data is saved.

27. The information providing method as claimed in claim 26, wherein said destination address is a URL (uniform resource locator).

28. The information providing method as claimed in claim 25, wherein said image data and said advertisement information designated by said user to said second data processing terminal of said recipient is included in Web page data.

29. The information providing method as claimed in claim 28, wherein said Web page data is data of the HTML (Hypertext Markup Language) format.

30. The information providing method as claimed in claim 25, wherein said image data is data comprising image data and text data.

31. The information providing method as claimed in claim 25, wherein said user information comprises gender information and age information.

32. The information providing method as claimed in claim 25, further comprising steps of:
discriminating said second data processing terminal of said recipient, and
resizing said image data based on a result of said discrimination.

33. The information providing method as claimed in claim 25, wherein said GUI information is for displaying a check box.

34. The information providing method as claimed in claim 25, wherein said authenticating step authenticating said user by checking the identification information with data saved in an authentication server.

35. The information providing method as claimed in claim 25, wherein said user information comprises property information corresponding to a property owned by said user or a purchase record information of said user.

36. An information providing server comprising:
authentication unit authenticating a user based on identification information of said user;
network interface configured to
receive image data transmitted from a first image data processing terminal of said user, wherein said image data is to be distributed to a second data processing terminal of a recipient different from said user;
transmit a notification of receiving said image data to said first image data processing terminal of said user; and
transmit advertisement information, selected on a basis of user information of said user, to said first image data processing terminal of said user, wherein said advertisement information is displayed with said notification of receiving of said image on said first image data processing terminal of said user, wherein GUI (graphical user interface) information to designate said advertisement information by said user is attached to said advertisement information; and
management unit providing said image data and said advertisement information designated by said user to said second data processing terminal of said recipient.

37. The information providing server as claimed in claim 36, wherein
said management unit transmitting a notification notifying said image received from said first image data processing terminal of said user to said second data processing terminal of said recipient,
wherein said notification includes a destination address of a saving location where said image data is saved.

38. The information providing server as claimed in claim 37, wherein said destination address is a URL (uniform resource locator).

39. The information providing server as claimed in claim 36, wherein said image data and said advertisement information designated by said user to said second data processing terminal of said recipient is included in Web page data.

40. The information providing server as claimed in claim 39, wherein said Web page data is state of the HTML (Hypertext Markup Language) format.

41. The information providing server as claimed in claim 36, wherein said image data is data comprising image data and text data.

42. The information providing server as claimed in claim 36, wherein said user information comprises gender information and age information.

43. The information providing server as claimed in claim 36, wherein said management unit discriminates said second data processing terminal of said recipient and a data conversion unit resizes said image data based on a result of said discrimination.

44. The information providing server as claimed in claim 36, wherein said GUI information is for displaying a check box.

45. The information providing server as claimed in claim 36, wherein said authenticating unit authenticating said user by checking the identification information with data saved in an authentication server.

46. The information providing server as claimed in claim 36, wherein said user information comprises property information corresponding to a property owned by said user or a purchase record information of said user.

* * * * *